(12) United States Patent
Kim et al.

(10) Patent No.: US 6,755,022 B2
(45) Date of Patent: Jun. 29, 2004

(54) TURBO-CHARGED INTERNAL COMBUSTION ENGINE WITH IN-CYLINDER EGR AND INJECTION RATE SHAPING

(75) Inventors: Charlie Chang-Won Kim, Martinsburg, WV (US); Timothy Andrew Suder, Greencastle, PA (US); Steven Stuart Trevitz, Mercersburg, PA (US); Jeffrey Scott Zsoldos, Knoxsville, MD (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 10/372,929

(22) Filed: Feb. 26, 2003

(65) Prior Publication Data

US 2003/0159441 A1 Aug. 28, 2003

Related U.S. Application Data

(60) Provisional application No. 60/360,005, filed on Feb. 28, 2002.

(51) Int. Cl.$^7$ .......................... F02B 37/10; F02M 37/04
(52) U.S. Cl. .......................... 60/608; 123/496; 239/88
(58) Field of Search .......................... 123/563, 446, 123/496, 124, 479, 498, 499, 445, 305, 198 F; 60/599, 606, 608, 612; 239/88–92

(56) References Cited

U.S. PATENT DOCUMENTS

| | | | |
|---|---|---|---|
| 1,952,881 A | | 3/1934 | Minter ...................... 123/90.6 |
| 2,585,029 A | | 2/1952 | Nettel |
| 3,396,533 A | | 8/1968 | Fischer |
| 3,676,999 A | | 7/1972 | Oldfield |
| 3,902,472 A | * | 9/1975 | Baugelin ................ 123/198 F |
| 3,925,989 A | | 12/1975 | Pustelnik |
| 3,961,199 A | | 6/1976 | Bronicki |
| 4,005,578 A | | 2/1977 | McInerney |
| 4,075,990 A | | 2/1978 | Ribeton |

(List continued on next page.)

FOREIGN PATENT DOCUMENTS

| | | | | |
|---|---|---|---|---|
| EP | 0 105 828 A2 | | 4/1984 | |
| EP | 0 750 103 A2 | | 12/1996 | |
| EP | 899437 A2 | * | 3/1999 | ........... F02B/37/00 |
| GB | 2 340 258 A | | 2/2000 | |
| JP | 11324777 A | * | 11/1999 | ........... F02D/41/02 |

OTHER PUBLICATIONS

Aceves, S.M., et al., "HCCI Combustion: Analysis and Experiments", *SAE Technical Paper Series*, Government/Industry Meeting, Washington, D.C., May 14–16, 2001, 2001-01-2077, 9 pages.

*Primary Examiner*—Thomas Denion
*Assistant Examiner*—Thai-Ba Trieu
(74) *Attorney, Agent, or Firm*—Rothwell, Figg, Ernst & Manbeck, PC

(57) ABSTRACT

A turbo-charged internal combustion cylinder assembly includes a combustion chamber, an intake port communicably connected with an intake manifold, and an exhaust port communicably connected with an exhaust manifold. An intake valve is disposed within the intake port, and an exhaust valve is disposed within the exhaust port, the valves facilitating, in an open position, or restricting, in a closed position, gas flow between their respective ports and the combustion chamber. A compressor may be communicably connected to the intake manifold so as to provide pre-combustion gases to, and regulate pressure of the combustion chamber. The exhaust valve may open while the intake valve is closed to exhaust post-combustion gases from the combustion chamber. Alternatively, the exhaust valve may open while the intake valve is open to admit post-combustion gases into the combustion chamber if the combustion chamber pressure is lower than the exhaust port pressure.

15 Claims, 19 Drawing Sheets

U.S. PATENT DOCUMENTS

| | | | |
|---|---|---|---|
| 4,142,493 A | 3/1979 | Schira et al. | |
| 4,164,032 A | 8/1979 | Nohira et al. | |
| 4,164,206 A | 8/1979 | Toelle | |
| 4,215,550 A | 8/1980 | Dinger et al. | |
| 4,228,655 A | 10/1980 | Herschmann et al. | |
| 4,350,129 A | 9/1982 | Nakajima et al. | |
| 4,385,598 A | 5/1983 | Nakajima et al. | |
| 4,388,802 A | 6/1983 | Dinger et al. | |
| 4,393,853 A | 7/1983 | Groves | |
| 4,426,848 A | 1/1984 | Stachowicz | |
| 4,428,192 A | 1/1984 | Dinger et al. | |
| 4,440,140 A | 4/1984 | Kawagoe et al. | |
| 4,446,840 A | 5/1984 | Nakagawa et al. | |
| 4,450,824 A | 5/1984 | Ando et al. | |
| 4,452,217 A | 6/1984 | Kawamura et al. | |
| 4,453,381 A | 6/1984 | Dinger | |
| 4,502,283 A | 3/1985 | Wandel | 60/609 |
| 4,594,993 A | 6/1986 | Engel et al. | |
| 4,596,225 A | 6/1986 | Oonaka et al. | 123/559.3 |
| 4,625,702 A | 12/1986 | Onishi | |
| 4,738,110 A | 4/1988 | Tateno | |
| 4,848,086 A | 7/1989 | Inoue et al. | |
| 4,879,673 A * | 11/1989 | Nagase et al. | 123/479 |
| 4,993,926 A * | 2/1991 | Cavanagh | 123/496 |
| 4,996,966 A | 3/1991 | Hitomi et al. | 123/559.3 |
| 5,090,204 A | 2/1992 | Bonitz et al. | |
| 5,203,830 A | 4/1993 | Faletti et al. | 123/90.16 |
| 5,230,320 A | 7/1993 | Hitomi et al. | 123/90.15 |
| 5,363,091 A | 11/1994 | Kotwicki et al. | |
| 5,408,979 A | 4/1995 | Backlund et al. | |
| 5,440,880 A | 8/1995 | Ceynow et al. | 60/605.2 |
| 5,601,068 A | 2/1997 | Nozaki | |
| 5,603,292 A | 2/1997 | Hakansson | 123/90.16 |
| 5,625,750 A | 4/1997 | Puskorius et al. | |
| 5,703,777 A | 12/1997 | Buchhop et al. | |
| 5,758,309 A | 5/1998 | Satoh | |
| 5,771,867 A | 6/1998 | Amstutz et al. | |
| 5,806,476 A | 9/1998 | Hakansson | |
| 5,890,359 A | 4/1999 | Enander | |
| 5,921,223 A | 7/1999 | Fukuma | |
| 5,924,280 A | 7/1999 | Tarabulski | |
| 6,009,862 A | 1/2000 | Wanat et al. | |
| 6,012,424 A | 1/2000 | Meistrick | 123/321 |
| 6,029,452 A | 2/2000 | Halimi et al. | |
| 6,079,211 A | 6/2000 | Wollenweber et al. | |
| 6,125,828 A | 10/2000 | Hu | 123/90.6 |
| 6,152,104 A | 11/2000 | Vorih et al. | 123/322 |
| 6,170,474 B1 | 1/2001 | Israel | |
| 6,256,993 B1 * | 7/2001 | Halimi et al. | 60/608 |
| 6,273,056 B1 * | 8/2001 | Shirakawa et al. | 123/305 |
| 6,530,363 B1 * | 3/2003 | Blass et al. | 123/499 |

\* cited by examiner

1000

TURBO-CHARGED INTERNAL COMBUSTION ENGINE WITH IN-CYLINDER EGR AND INJECTION RATE SHAPING

CROSS-REFERENCE TO RELATED APPLICATIONS

This application claims priority to Provisional Application Serial No. 60/360,005, filed Feb. 28, 2002, the disclosure of which is incorporated by reference.

FIELD OF THE INVENTION

The invention relates to internal combustion engines, and in particular, to turbo-charged internal combustion engines with fuel injection rate shaping and internal exhaust gas recirculation.

DESCRIPTION OF THE RELATED ART

Emission control standards for internal combustion engines have tended to become more stringent over time. The sorts of emissions to be controlled tend to fall into at least four broad categories: unburned hydrocarbons, carbon monoxide, particulates, and oxides of nitrogen (NOx). Unburned hydrocarbons and carbon monoxide tend to be produced by inefficient or incomplete combustion. Efficient, complete combustion, on the other hand, tends to produce oxides of nitrogen.

Efficient, complete combustion tends to be characterized by high combustion chamber temperatures. The heat associated with high combustion chamber temperatures acts as a catalyst, promoting the binding of oxygen in the air charge to the otherwise inert nitrogen and producing oxides of nitrogen. An engine that is running efficiently, therefore, may produce oxides of nitrogen. Controlling the amounts of emissions produced by an internal combustion engine, then, becomes an issue of balancing combustion efficiency against raising combustion temperatures high enough to produce oxides of nitrogen.

Since the ingredients of oxides of nitrogen come from the intake air, one possibility to reduce the amounts of oxides of nitrogen may be to limit the air available for combustion. Compression-ignition engines, unlike spark-ignition engines, are often run with an excess of air over the stoichiometric ratio, so there is lots of nitrogen available for oxidation. This is because the production of particulates, such as ash, tends to rise as the air/fuel (A/F) mixture approaches stoichiometric. This is evidenced by the observation that diesel trucks often emit puffs of smoke under heavy acceleration. Since compression-ignition engines need to run with an excess of air to avoid emitting particulates, reducing the production of oxides of nitrogen by reducing the amount of air available for combustion is not a practical solution.

Another way to control the production of oxides of nitrogen is to reduce peak combustion chamber temperatures. Since production of oxides of nitrogen tends to depend on high combustion chamber temperatures as a catalyst, reducing the peak temperature ameliorates one of the conditions necessary for the production of oxides of nitrogen. Reducing the peak combustion chamber temperature may thus reduce the amount of oxygen that binds with nitrogen, with a consequent reduction in the quantity of oxides of nitrogen produced.

One means of lowering the high combustion chamber temperatures produced by an efficient combustion event is to cool the combustion chamber during combustion. The combustion chamber may be cooled by, e.g. reintroducing some of the products of previous combustion events back into the combustion chamber, a process known as exhaust gas recirculation (EGR). Since the products of efficient combustion are primarily water and carbon dioxide, neither of which is very flammable, this has the effect of extinguishing the combustion somewhat. The peak temperatures reached in the combustion chamber will consequently be lower, which retards the production of oxides of nitrogen. Clearly, the amount and timing of the introduction of products of combustion must be controlled accurately to avoid impairing the performance of the engine.

Lowering combustion chamber temperatures may have the collateral benefit of reducing exhaust manifold temperatures, as well as stack temperatures. Reducing stack temperatures reduces the temperature in exhaust after-treatment equipment such as oxidation catalysts, with a consequent reduction in the formation of, e.g. sulfates. Reducing stack temperatures may also reduce the production of particulates.

One way to reintroduce some of the products of previous combustion events into the combustion chamber is with external EGR. In external EGR, a tube or plenum conducts some post-combustion gases from the combustion chamber, usually through an exhaust manifold, to a valve. When the valve is opened, the post-combustion gases are readmitted to the combustion chamber, often passing through the intake manifold first. If the post-combustion gases pass through the intake manifold they will mix with fresh make-up air coming in through the air cleaner and be distributed relatively evenly to each of the combustion chambers when its respective intake valve opens.

External EGR, however, relies on high engine heat rejection to work, since the post-combustion gases must travel a relatively long way. Also, the valves and other hardware associated with external EGR increase the cost and complexity of the engine. Furthermore, the addition of external EGR and its associated hardware to an existing engine may require the chassis, front clip, or sheet metal to be re-arranged to allow the engine to fit. Furthermore, if the external EGR is plumbed through the intake manifold, it may be difficult to control the amount of exhaust gas that is re-admitted to each individual combustion chamber. This may pose a problem if, e.g. some combustion chambers run hotter than other combustion chambers, such as those that are nearer the water jacket exit.

A combustion chamber near the exit to the water jacket will be transferring heat to warmer coolant, other things being equal, than a combustion chamber near, e.g. the entrance to the water jacket, since the coolant has already been past the other combustion chambers when it reaches the exit. There will thus be a smaller temperature differential between the combustion chamber and the coolant. Thus the metal around, e.g. the combustion chamber will be maintained at a higher temperature, other things being equal. It would be desirable if the amount of exhaust gas that is readmitted to a combustion chamber could be controlled on an individual basis, commensurate with the temperatures prevailing in that combustion chamber.

The EGR valve, along with the associated actuator and control hardware, is also a point of potential failure, jeopardizing the durability of the engine. It would be desirable if the EGR valve, and its associated actuator and control hardware, could be eliminated. It would further be desirable if the amount and timing of post-combustion gases that re-enter the combustion chamber could be controlled by varying the pressure in the exhaust manifold relative to the pressure in the combustion chamber, rather than with an external valve. Finally, allowing post-combustion gases to re-enter the combustion chamber directly from the exhaust manifold may reduce the transfer time of the post-combustion gases back into the combustion chamber, improving the responsiveness of the EGR system and allowing their application to be optimized or, at least, reduced.

Many truck engines are supercharged. Some superchargers are belt-, chain- or gear-driven, while others, so-called turbo-chargers, rely on a turbine to convert the kinetic energy in exhaust gases to rotational momentum in a compressor. There are those who define superchargers and turbo-chargers as separate entities. For the purposes of this application, however, a turbo-charger will be defined as a turbine-driven supercharger.

Turbo-machinery, such as superchargers, have components that rotate. These components possess inertia. These components gain momentum with respect to this inertia when they are turned, by, e.g. a belt or a turbine. Building rotational momentum requires time, which manifests itself as lag. The lag is generally proportional to the inertia of the turbine rotor and compressor. Thus the inertia of the turbine rotor and the compressor rotor contribute to lag. There are advantages to be found with using smaller compressors and turbine trim, such as better transient engine response, which in turn helps to control emissions, such as, for example, particulates. It would be desirable to be able to reduce the sizes of the turbine and the compressor rotors, thus reducing the lag normally associated with, e.g. turbo-chargers, and improving the transient response.

Turbo-chargers rely on post-combustion gases for their energy. Sometimes, under operating conditions such as at start-up or low-speed operation, an engine does not produce enough post-combustion gases to drive the compressor adequately. It would be desirable if a compressor had a secondary source of power, such as an electrical or belt driven-clutch-assist, for situations when more turbo boost is called for than the available exhaust gas can produce. This would be especially desirable if the turbo-charger were part of the emission control system.

Carnot taught that there are two ways to increase the efficiency of a heat engine, by raising the temperature at which heat is added or by reducing the temperature at which heat is rejected. Although every point within a diesel engine combustion chamber should be at or above the kindling temperature of the fuel when fuel is admitted to the combustion chamber, this may not always be the case. The fuel itself may, e.g. be cold relative to the combustion chamber, especially during winter driving. Cold fuel may thus reduce the temperature locally in the combustion chamber below the kindling temperature of the fuel.

Transient conditions such as those due, e.g. to start up or rapid changes in throttle position may contribute to cooler combustion chamber temperatures as well. Throttling is a cooling process, and so fuel that has been throttled will generally be cooled somewhat. It would be desirable if the fuel being injected were pre-heated slightly by, e.g. using the heat of the post-combustion gases, so that it would be more likely to be ignited completely upon entry into the combustion chamber.

Fuel is normally injected, on the average, into the center of a combustion chamber. Although average combustion chamber temperatures may be relatively constant, local temperatures may fluctuate. Combustion chamber temperatures, for example, may vary both spatially across the combustion chamber, and over time during the combustion event.

Since some points within a combustion chamber are hotter than others, it would be desirable to be able to adjust the rate at which fuel is injected. Thus, the rate at which fuel was injected could be varied at different times and at different points within the combustion chamber, during the combustion event, so fuel was injected where and when the combustion chamber temperatures are highest. This may, for example, allow the combustion process to rely less on propagation of a flame front to burn the fuel. It may also allow the peak temperature to be reduced, thereby reducing formation of oxides of nitrogen, since the fuel can be directed at a point where the temperatures are highest.

Adjusting the rate at which fuel is injected is often termed injection rate shaping. One means of injection rate shaping is described in U.S. Pat. No. 6,336,444 B1 to Suder, the disclosure of which is incorporated by reference. It would be desirable for injection rate shaping to be combined with, e.g., a lash adjustment mechanism, improved turbo-charger efficiency, or in-cylinder exhaust gas recirculation with and without post bump shutoff capability.

SUMMARY OF THE INVENTION

In several aspects, the invention may provide post bump shutoff with a lash adjustment mechanism, improved turbo-charger efficiency, a modified post bump injection system, and in-cylinder exhaust gas recirculation with and without post bump shutoff capability. Camless or variable valve timing and lift technologies may be used to shape the post bump to match the region where exhaust port pressure is higher than intake port pressure. In addition, these technologies may provide post bump shutoff capability. Various air systems (shown in FIGS. 5, 6, 7A, 7B, and 11) can be used to overcome lack of airflow (A/F) at low engine speeds with a fixed timing and duration post bump without the shutoff capability.

In one aspect, turbo-chargers may have variable geometry turbines and waste gates. In another aspect, turbo-chargers may be arranged in series. In still another aspect, post bump may be shut off at low engine speeds via, e.g. a lash adjusting mechanism to maintain an acceptable A/F ratio. A conventional turbo-charging scheme (with fixed geometry turbine—see FIG. 8) may also be implemented with shutoff capability. Engine power curves (engine speed and load) may also be manipulated to maintain acceptable A/F at lower engine speeds if the shutoff capability is not available.

In another aspect, the invention provides a combination of in-cylinder EGR and injection rate shaping with a fixed geometry turbo-charger that may be optimally matched for low speed engine operation and good transient response.

In still another aspect, the invention may be a combination of in-cylinder EGR and airflow control via an electrically-assisted turbo-charger, or a variable turbine geometry turbo-charger. Included are injection rate shaping and a turbo-charger that may be optimally matched for low speed engine operation, in addition to a variable turbine geometry turbo-charger and an electrically assisted turbo-charger.

Injection rate shaping may be provided in combination with the specific strategy of in-cylinder EGR. The in-cylinder EGR may be accomplished by, e.g. opening an exhaust valve during the intake stroke, while the exhaust port pulse pressure is greater than the cylinder and intake port pressure. Injection rate shaping may be a combination of pre-, or post-combustion injection rate shaping, and changing a shape of the main injection pulse. Airflow control via, e.g. an electrically assisted turbo-charger, a variable turbine geometry turbo-charger, or a smaller turbine and compressor match may also be included.

In particular, in one embodiment a turbo-charged internal combustion cylinder assembly includes a cylinder having a cylinder head at an end thereof, a combustion chamber with an intake port disposed in the cylinder head, and an intake valve movably disposed in the intake port. The combustion chamber may be communicably connected to the turbo-charger via the intake port so the compressor may provide pre-combustion gases to the combustion chamber when the intake valve is open. An exhaust port is also disposed in the cylinder head, with an exhaust valve movably disposed in the exhaust port that communicably connects the combustion chamber to an exhaust manifold. The exhaust valve may open to exhaust post-combustion gases to the exhaust manifold while the intake valve is substantially closed, and the exhaust valve may open to admit post-combustion gases to the combustion chamber while the intake valve is substantially open. A fuel injector disposed in the cylinder head may admit fuel to the combustion chamber near piston top dead center during, e.g. a compression stroke while both the intake and the exhaust valves are closed. Such a fuel injector may include a pump chamber, a fuel-injecting plunger for reciprocating within the pump chamber, and a discharge nozzle connected to the pump chamber for injecting fuel into the combustion chamber. A spill valve may be positioned between the chamber and the nozzle for controlling a rate of fuel injection to the combustion chamber, the spill valve having a first position providing a maximum fuel injection rate, a second position providing a substantially zero fuel injection rate, and at least one intermediate position providing an intermediate fuel injection rate between the maximum fuel injection rate and the zero fuel injection rate.

In a second embodiment a turbo-charged internal combustion engine system includes a cylinder having a combustion chamber with an intake valve disposed to admit pre-combustion gases to the combustion chamber, and an exhaust port. A first fuel injector may be disposed in the combustion chamber while a second fuel injector disposed in the exhaust port. An exhaust valve may be disposed to admit post-combustion gases to the combustion chamber while an exhaust port pressure in the exhaust port is higher than a combustion chamber pressure in the combustion chamber. The exhaust valve may be reopened while the exhaust port pressure is higher than the combustion chamber pressure, and fuel may be injected by a first fuel injector or a second fuel injector. A purpose for injecting fuel while an exhaust port pressure is higher than a combustion chamber pressure may be to elevate the fuel temperature with the exhaust gas, possibly vaporizing the fuel, and also to mix the fuel with the pre-combustion gases entering through the intake valve. Compression of the fuel and air mixture takes place after the intake and the exhaust valves close, allowing the fuel to autoignite and producing homogenous charge compression ignition (HCCI) combustion. Autoignition may be controlled by, e.g. adjusting EGR, the timing of the intake valve event, the compression ratio, or the inlet manifold temperature.

In a third embodiment a fuel injector may be used to control the start of combustion. A first quantity of fuel may be injected into the exhaust port via a second fuel injector while an exhaust port pressure is higher than a combustion chamber pressure and when an exhaust valve is reopened. A temperature of the first quantity of fuel may be elevated by the heat of the exhaust gases, and the fuel may be vaporized, when the first quantity of fuel mixes with pre-combustion gases entering through the intake port. Compression of the fuel and air mixture takes place when the intake and exhaust valves have closed. The first quantity of fuel, however, is insufficient for auto-ignition to occur. Combustion may not occur until fuel is also injected by a first fuel injector in a quantity sufficient to auto-ignite. Engine-out emissions may be controlled by adjusting, e.g. the quantities of fuel injected by the first and the second injectors, a timing of fuel injection by the first fuel injector, the quantity of EGR, a timing of an inlet valve closing, a compression ratio, or an inlet manifold temperature.

DETAILED DESCRIPTION OF THE PREFERRED EMBODIMENTS

Figure 1:
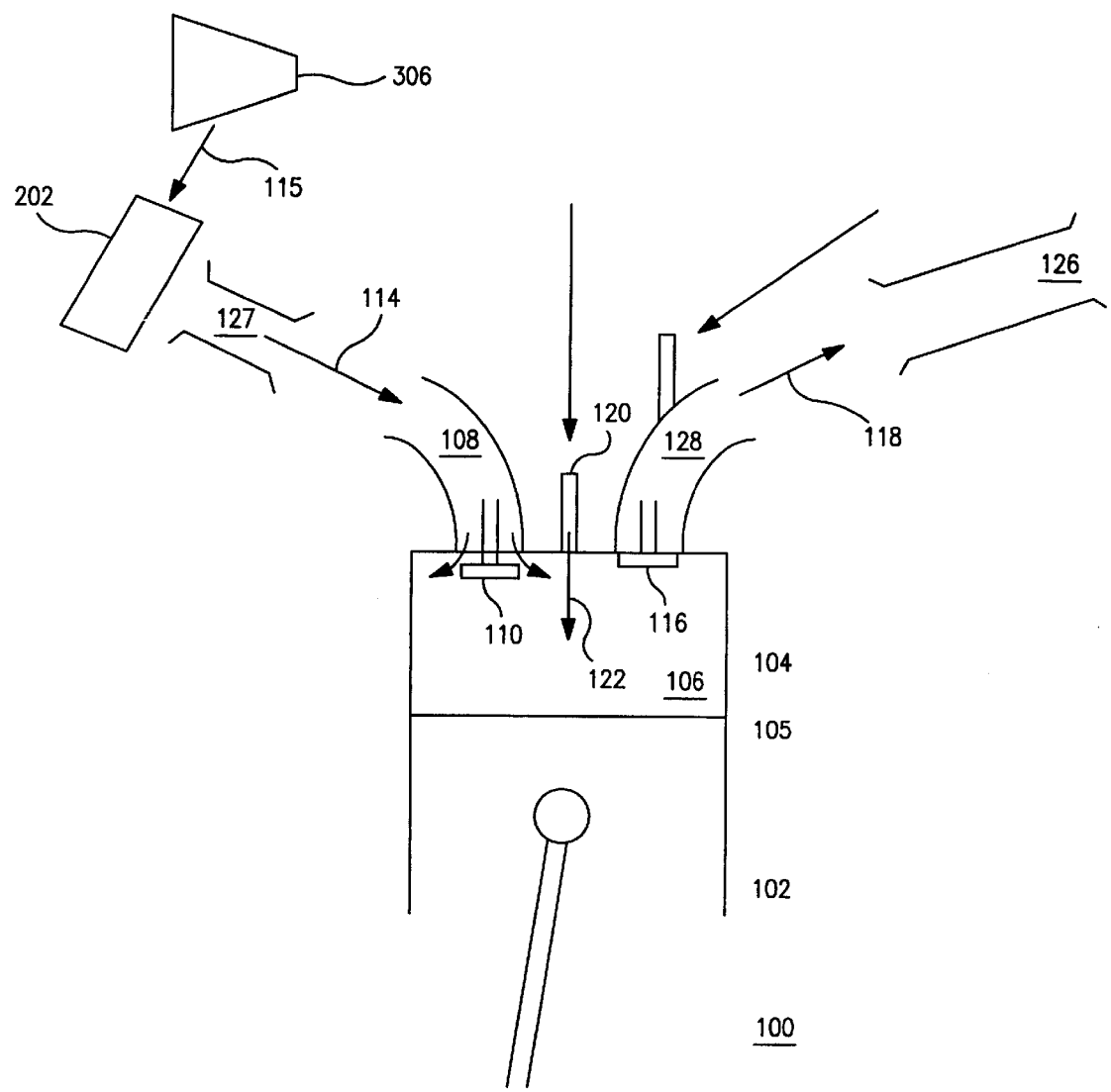
FIG. 1 is a schematic diagram of a turbo-charged internal combustion cylinder assembly according to a first embodiment of the invention.

In FIG. 1 is shown a turbo-charged internal combustion cylinder assembly 100 according to a first embodiment of the invention. Although the embodiments described herein are described in the context of a compression-ignited engine, the concept of the invention could be adapted to other types of ignition as well, such as, e.g. a spark-, hotbulb- or glowplug-ignited engine.

In assembly 100 a cylinder 102 has a cylinder head 104 substantially fixedly disposed at one end 105, with a combustion chamber 106 disposed in-cylinder head 104. Cylinder head 104 has an intake port 108 with an intake valve 110 movably disposed in intake port 108, through which combustion chamber 106 may communicate with, e.g. a compressor 306. Compressor 306 may, e.g. provide pre-combustion gases 114 through an intake manifold 127, and also through an aftercooler 202 if so equipped, to combustion chamber 106 when intake valve 110 is substantially open. Pre-combustion gases 114 may be, e.g. air, such as a mixture of nitrogen, oxygen, carbon dioxide, water vapor, and trace elements such as argon.

Figure 2:
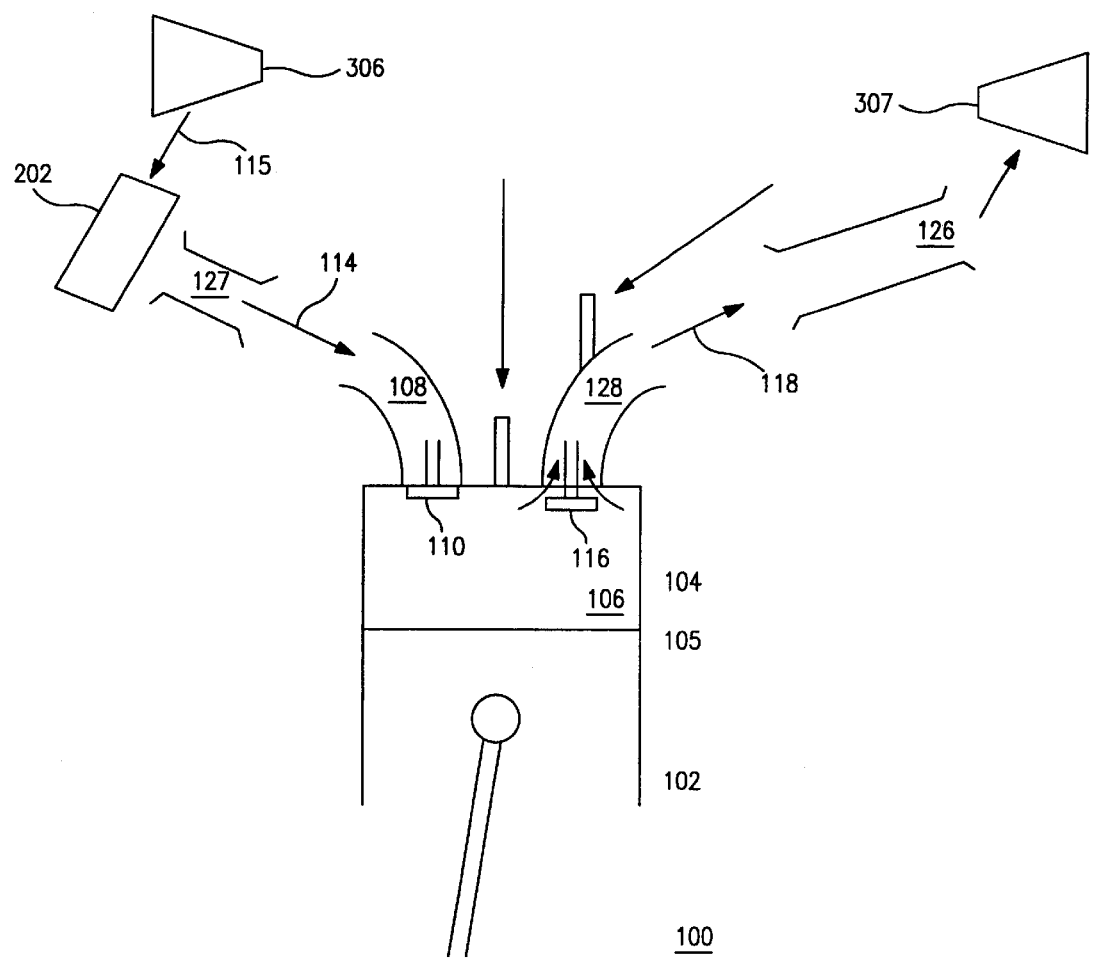
FIG. 2 is a schematic diagram of a turbo-charged internal combustion cylinder assembly according to the embodiment shown in FIG. 1.

As shown in FIG. 2, an exhaust port 128 may also be disposed in-cylinder head 104, with an exhaust valve 116 movably disposed in exhaust port 128, through which combustion chamber 106 may communicate with, e.g. an exhaust manifold 126. Post-combustion gases 118 may, e.g. exhaust to exhaust manifold 126 and consequently to turbine 307 when exhaust valve 116 is substantially open and intake valve 110 is substantially closed. Post-combustion gases 118 may be, e.g. exhaust, such as a mixture of nitrogen, oxygen, unburned hydrocarbons, carbon dioxide, water vapor, and trace elements such as argon. Although this embodiment of the invention is described in the context of a four-cycle engine, the principle of the invention may be applied to, e.g. a two-stroke engine as well.

Figure 3:
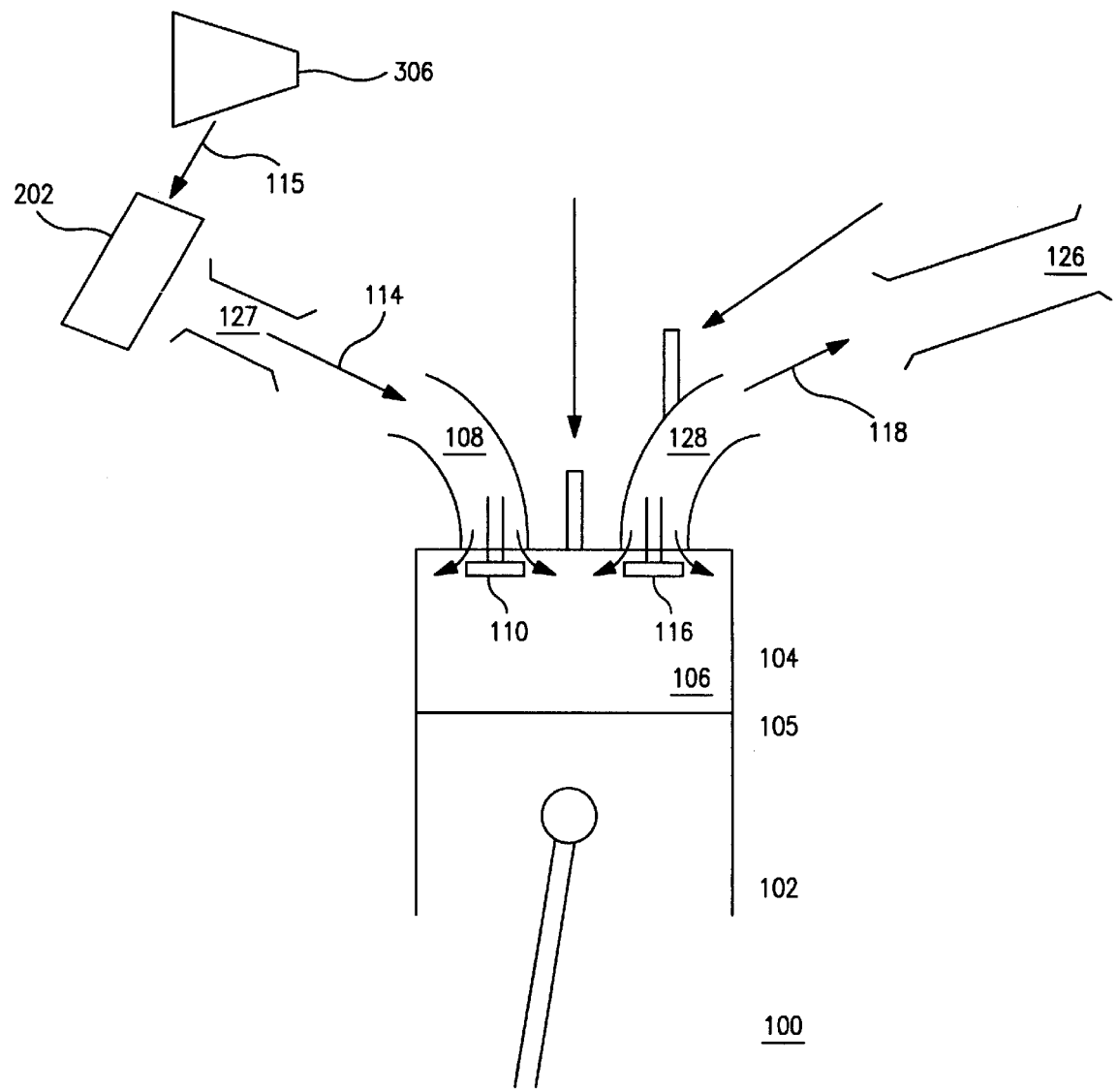
FIG. 3 is a schematic diagram of a turbo-charged internal combustion cylinder assembly according to the embodiment shown in FIG. 1.
Figure 4:
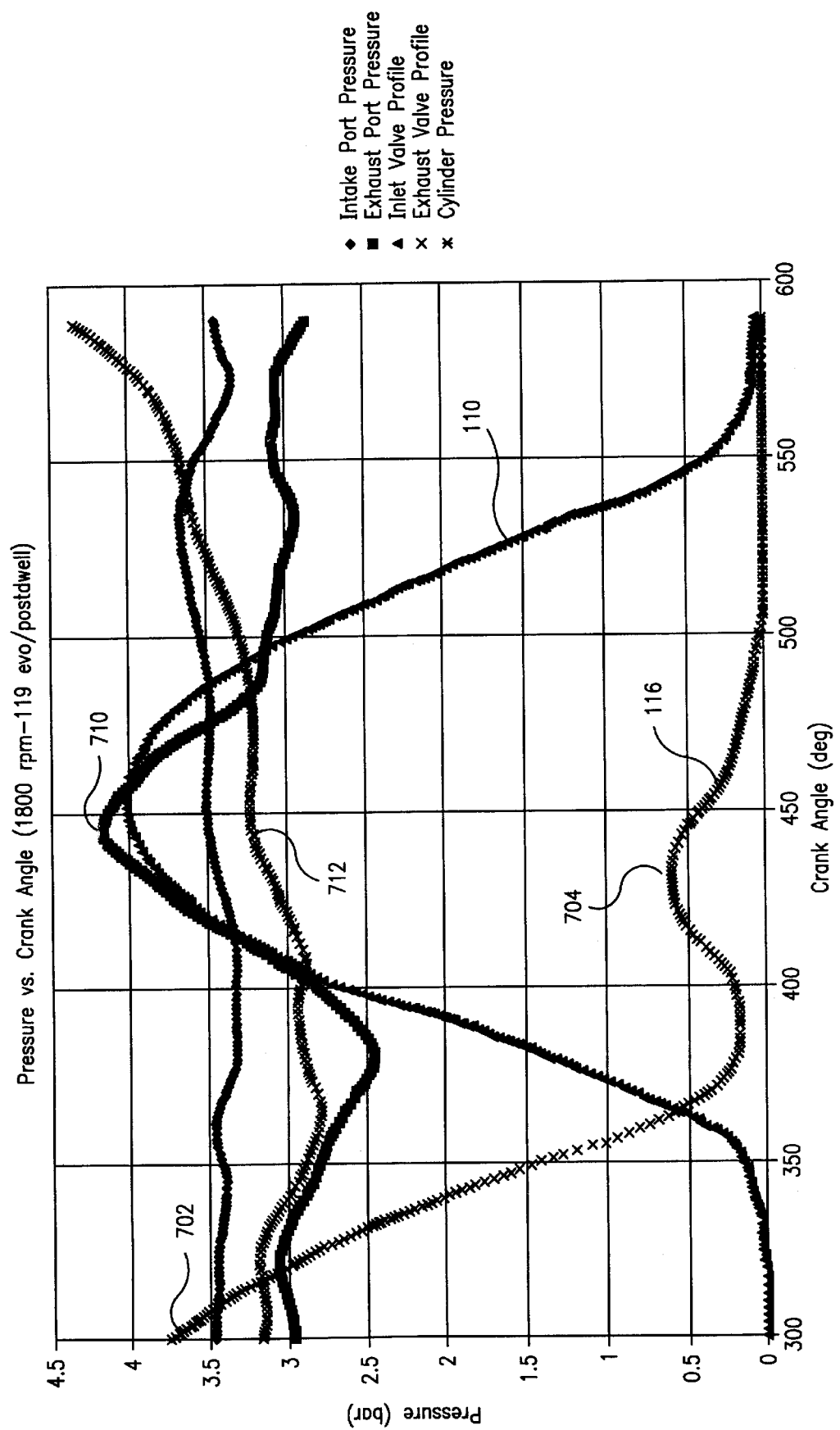
FIG. 4 is a graph of a cylinder pressure versus crank angle for a turbo-charged internal combustion engine according to an embodiment of the invention.

As shown in FIG. 3, exhaust valve 116 may, e.g. open and admit post-combustion gases 118 to combustion chamber 106 while intake valve 110 is substantially open. This is an example of internal EGR, which is also known as 'post bump'. The bump refers to the exhaust cam lobe. As shown in FIG. 4, the first time exhaust valve 116 opens, during the exhaust stroke, is the bump. The next time exhaust valve 116 opens, while intake valve 110 is also substantially open, occurs after the bump, or post bump. Post-combustion gases 118 in exhaust port 128 may be at a pressure (710 in FIG. 4) higher than that prevailing (712 in FIG. 4) in combustion chamber 106 for at least part of a cycle.

In one embodiment, exhaust valve 116 may be opened with an actuator that may be, e.g. a cam, such as a second exhaust cam lobe, a hydraulic actuator, a piezoelectric motor, a voice coil, or a solenoid, as shown in FIG. 14. A second exhaust cam lobe may be formed on the existing exhaust cam or on a separate cam.

Although the various embodiments of the invention are described in the context of intake valve 110 and exhaust valve 116 as poppet valves, other types of valves such as, e.g. sleeve valves, rotary valves, louvers, porous membranes, or slide valves could be used as well.

Figure 5:
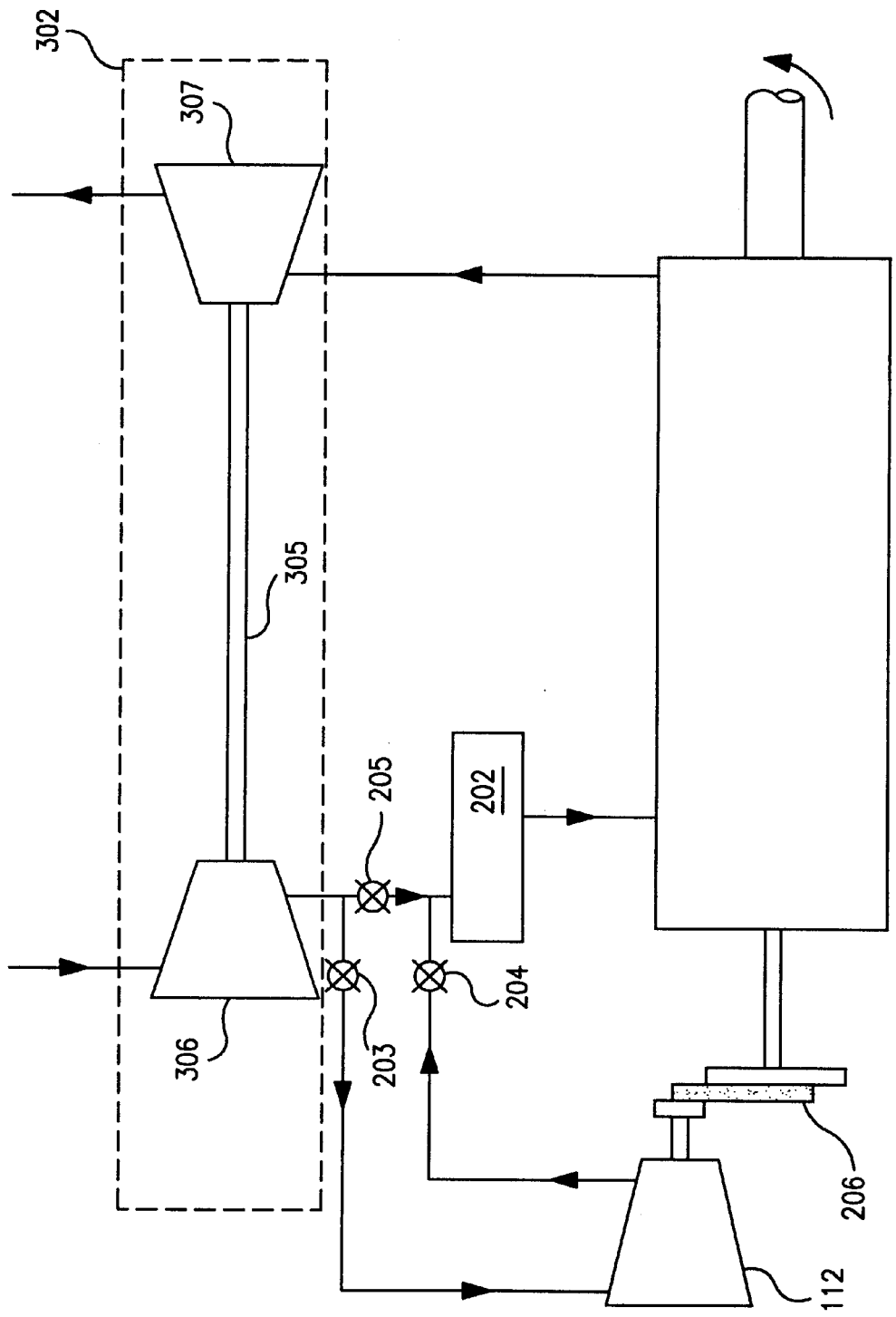
FIG. 5 is a schematic diagram of a super-charged and turbo-charged internal combustion engine according to an embodiment of the invention.

In one embodiment, shown in FIG. 5, pressurized pre-combustion gases 114 from compressor 306 may be enhanced by clutch-driven compressor 112. Turbo-charger 302 may, e.g. be comprised of a compressor 306 and a turbine 307 connected by a shaft 305. In this case compressor 306 could supply pressurized pre-combustion gases 114 to clutch-driven compressor 112 while a clutch 206 is engaged, which will in turn compress further the already pressurized pre-combustion gases 114 and supply them to combustion chamber 106. This may be particularly useful when, e.g. a speed or load of an engine is low, reducing the energy available in the post-combustion gases 118. In this case the amount of energy available might be too low to provide adequate power by turbine 307 to drive compressor 306 through shaft 305. Valve 205 may be closed while, e.g. valve 203 and valve 204 are open.

In one embodiment, pre-combustion gases 114 are supplied solely from compressor 306 with clutch 206 disengaged or slipped. This may occur when an engine speed or load is high. Under these conditions, energy in post-combustion gases 118 is adequate to power turbine 307 sufficiently to drive compressor 306 through shaft 305 and produce adequate boost. Valves 203 and 204 are closed while valve 205 is open.

Clutch 206 is a clutch in the generic sense, meaning any convenient means of providing intermittent or interruptable transmission of power, and may be, e.g. a single- or a multiple-plate clutch, such as a dry- or a wet-plate clutch, a fluid coupling, such as a hydraulic clutch or a hydrostatic drive, a centrifugal clutch, or an electrostatic clutch. Clutch 206 may also be a continuously variable transmission, such as a belt on pulleys of variable radii, an electric generator driving an electric motor, or a hydraulic turbine driving an impeller, as shown in FIG. 15.

The pressure prevailing inside a normally-aspirated combustion chamber 106 while intake valve 110 is open will, in general, be at or below substantially ambient pressure for at least part of a cycle. Turbo-charged pre-combustion gases 114 will be, in general, at a pressure higher than ambient pressure. The pressure prevailing inside exhaust manifold 126 will thus also be higher than that prevailing inside a normally aspirated combustion chamber 106 while intake valve 110 is open, and, consequently, while exhaust valve 116 is also open, for at least part of a cycle.

Since the volume of pre-combustion gases 114 delivered to combustion chamber 106 may be controlled by, e.g. engaging and disengaging clutch 206, the pressure in the combustion chamber 106 may be controlled and, in particular, raised relative to the pressure in exhaust manifold 126. Since post combustion gases 118 will, in general, move to regions of lower pressure, the volume of post combustion gases 118 returning to combustion chamber 106 when exhaust valve 116 is open may also be controlled by adjusting the pressure in combustion chamber 106 relative to that of exhaust manifold 126.

If, e.g. an engine- or powertrain-controller called for internal exhaust gas recirculation, clutch 206 could be, e.g. disengaged or slipped, reducing the pressure of pressurized pre-combustion gases 114 being supplied to combustion chamber 106 relative to that of exhaust manifold 126. Since post-combustion gases 118 would then be at a higher pressure than that of combustion chamber 106, some post-combustion gases 118 would be returned to combustion chamber 106 when both intake valve 110 and exhaust valve 116 were open.

Since the conditions calling for the addition of post-combustion gases 118 may be generally constant over several cycles of engine operation, the control of clutch 206 would not need to change constantly or instantaneously. Once a particular set operating conditions was reached, the amount of pressure in combustion chamber 106 relative to that of exhaust manifold 126 could be relatively constant. Post-combustion gases 118 could thus, e.g. be used to charge the combustion chamber in the manner of a standing wave.

A take-down at, e.g. the end of a runner of exhaust manifold 126 will present a different impedance to an exhaust pulse, i.e. a pulse of post-combustion gases 118 than the runner itself. An exhaust pulse may thus travel the length of a runner of exhaust manifold 126, be reflected, or echoed, at the take-down, and return. Such an exhaust pulse would require a certain amount of time to make the round trip. The time required would depend on, inter alia the length of the runner and the pressure differential across the runner.

In one embodiment, the length of the runner could be matched to the time an exhaust pulse would be expected to require to complete the round trip. Thus, for a given engine speed, such as e.g. a rated engine speed, or a speed at which the engine was likely to run at highway speeds, the length of the runner could be set so that, e.g. a previously-emitted exhaust pulse had just enough time to make the round-trip to the end of the runner and back just as exhaust valve 116 was opening during post-bump. Thus, a returning exhaust pulse would reach exhaust valve 116 while it was open to admit post-combustion gases 118 to combustion chamber 106 while intake valve 110 was open, i.e. during post bump. Post-combustion gases 118 could thus, e.g. be used to-charge the combustion chamber in the manner of a standing wave, such as may exist in a tuned exhaust. In a similar manner, a length of intake manifold 127 runners can be varied to provide lower pressure in combustion chamber 106 relative to that of exhaust port 128 which would increase the amount of post-combustion gases 118 transported to the combustion chamber 106 when both intake valve 110 and exhaust valve 116 are open. A runner length could be varied by, e.g. providing a valve to redirect part of the gas flow through a shunt.

The length of a runner however, is not easily changed after an engine has been built. The timing of the exhaust pulses may thus be tuned for only a narrow range of engine speeds, and harmonics thereof. In a preferred embodiment, the amount of pressure in combustion chamber 106 relative to that of exhaust manifold 126, i.e. the pressure differential across the runner, could be adjusted to vary the speed at which a pulse traveled the length of the runner. The pressure differential could thus be controlled to substantially ensure that an exhaust pulse was returning just as exhaust valve 116 was open during post-bump over a wider range of engine speeds. The timing of the opening of exhaust valve 116 may be changed to affect the timing of the exhaust pulses as well.

If, e.g. the exhaust pulses were arriving late, the amount of pressure in combustion chamber 106 relative to that of exhaust manifold 126 could be lowered. This would result in a larger pressure differential across the exhaust manifold runner, adding impetus to the exhaust pulse, speeding it up so it arrived sooner. The tuning could be accomplished, e.g. by slipping clutch 206, as discussed above, or any method of pressure control discussed herein, and equivalents thereof.

If, on the other hand, the exhaust pulses were arriving early, the amount of pressure in combustion chamber 106 relative to that of exhaust manifold 126 could be raised. This would result in a smaller pressure differential across the exhaust manifold runner, impeding the exhaust pulse and slowing it down so it arrived later.

In another embodiment, turbo-charger 302 may include, e.g. an aftercooler 202 to cool pre-combustion gases. In still another embodiment, turbo-charger 302 may include, e.g. a shutoff valve 204 between compressor 306 and aftercooler 202 to reduce a flow of pre-combustion gases. Shutoff valve 204 may be used to control the pressure in the combustion chamber 106 relative to the pressure in e.g. exhaust manifold 126 in the same manner as the clutch-driven compressor. Shutoff valve 204 may be, e.g. controlled or actuated electrically, hydraulically, pneumatically, or mechanically.

If, e.g. an engine or powertrain controller called for internal exhaust gas recirculation, shutoff valve 204 could be, e.g. partially or completely closed, reducing the pressure of pressurized pre-combustion gases 114 being supplied to combustion chamber 106 relative to that of exhaust manifold 126. Since post-combustion gases 118 would then be at a higher pressure than that of combustion chamber 106, some post-combustion gases 118 would be returned to combustion chamber 106 when both intake valve 110 and exhaust valve 116 were open.

Figure 6:
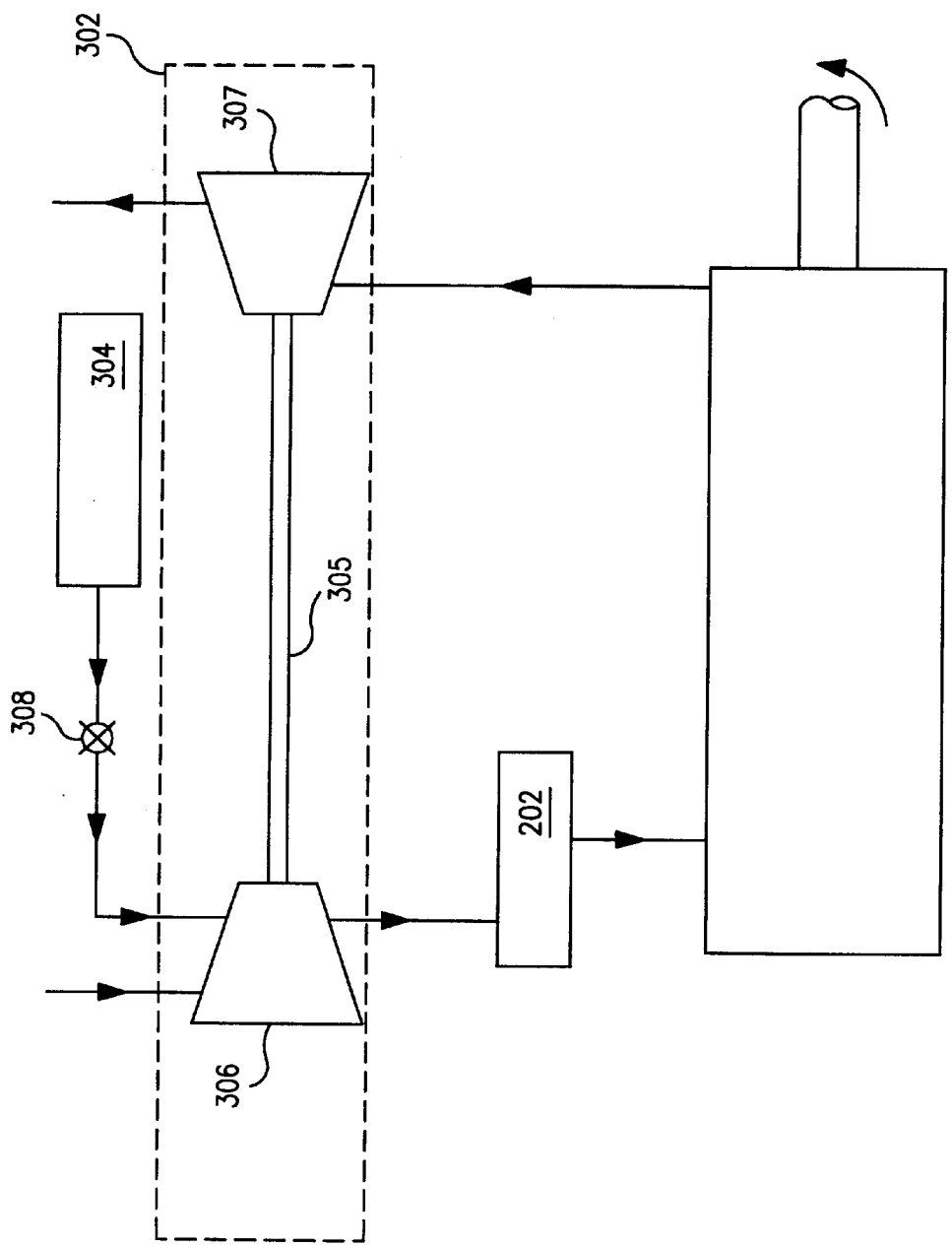
FIG. 6 is a schematic diagram of an air-assisted turbo-charged internal combustion engine according to an embodiment of the invention.

In one embodiment, shown in FIG. 6, turbo-charger 302 may be, e.g. comprised of a compressor 306 and a turbine 304 connected by a shaft 305. Turbo-charger 302 may be, e.g. a fixed-geometry turbo-charger, a variable-geometry turbo-charger, or a low inertia turbo-charger. In another embodiment, turbo-charger 302 may include, e.g. a source of compressed air 304 to supply pre-combustion gases to a compressor 306 of turbo-charger 302. In the alternative, source of compressed air 304 may supply pre-combustion gases 114 to combustion chamber 106 directly.

Source of compressed air 304 may be used to supply pre-combustion gases to a compressor 306 if, e.g. there are not sufficient post-combustion gases 118 to drive a compressor 306 adequately. This may be the case under operating conditions such as, e.g. start-up or low-speed operation. Source of compressed air 304 may also be used to control the pressure in the combustion chamber 106 relative to the pressure in e.g. exhaust manifold 126 in the same manner as the clutch-driven compressor.

If, e.g. an engine or powertrain controller called for internal exhaust gas recirculation, source of compressed air 304 could be, e.g. partially or completely restricted, reducing the pressure of pressurized pre-combustion gases 114 being supplied to combustion chamber 106 relative to that of exhaust manifold 126. Since post-combustion gases 118 would then be at a higher pressure than that of combustion chamber 106, some post-combustion gases 118 would be returned to combustion chamber 106 when both intake valve 110 and exhaust valve 116 were open.

In one embodiment, turbo-charger 302 may include, e.g. a shutoff valve 308 between source of compressed air 304 and compressor 306. In an alternative embodiment, source of compressed air 304 may be recharged between uses.

Engine performance may also be enhanced by electrically assisting turbo-charger 302 for better airflow control. An electrically assisted turbo-charger may improve low engine speed operation by providing combustion air to the engine such as, e.g. with a long duration of exhaust valve reopening.

Figure 7A:
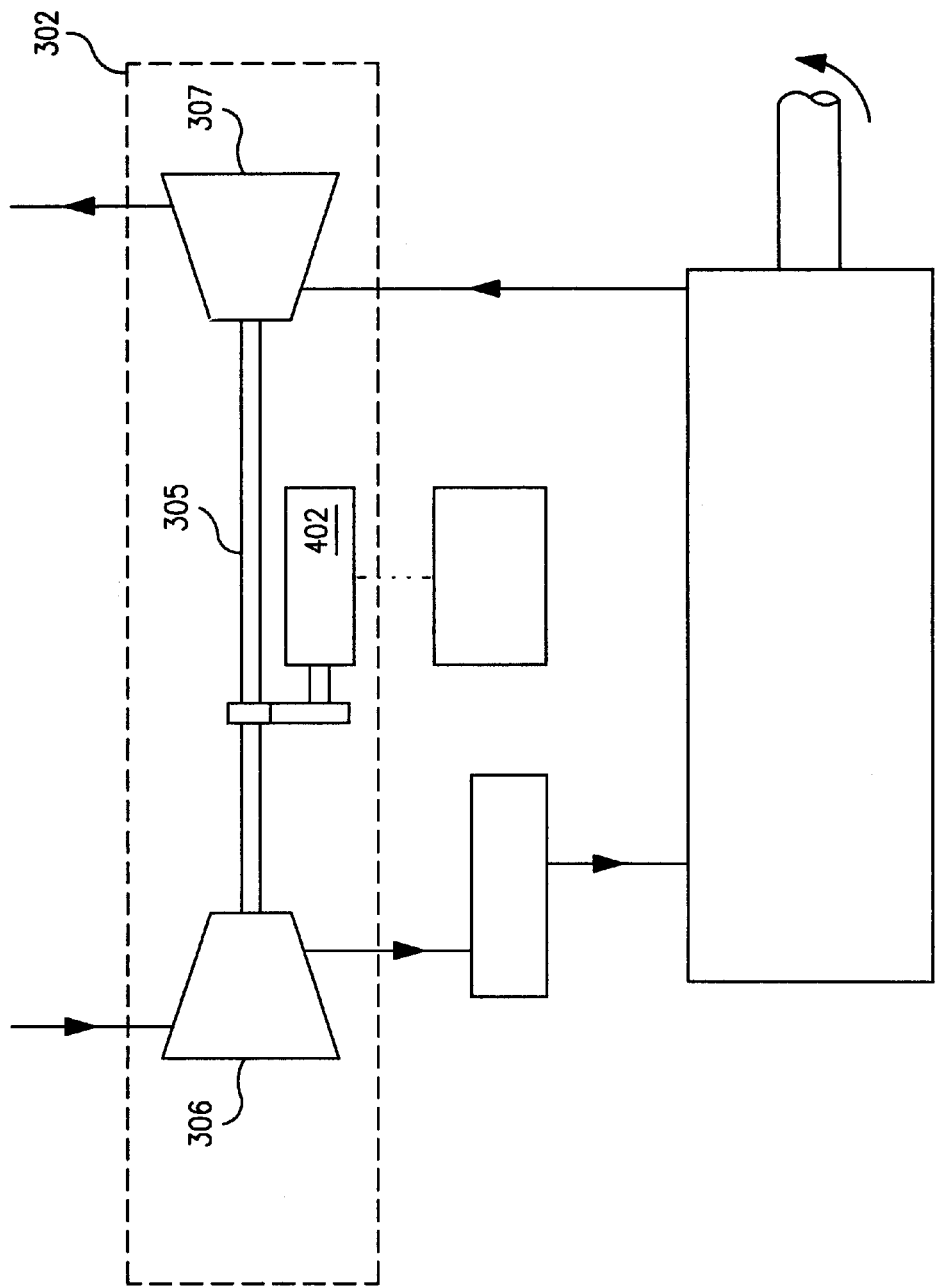
FIGS. 7A–7B is a schematic diagram of an electrically-assisted turbo-charged internal combustion engine according to an embodiment of the invention.
Figure 7B:
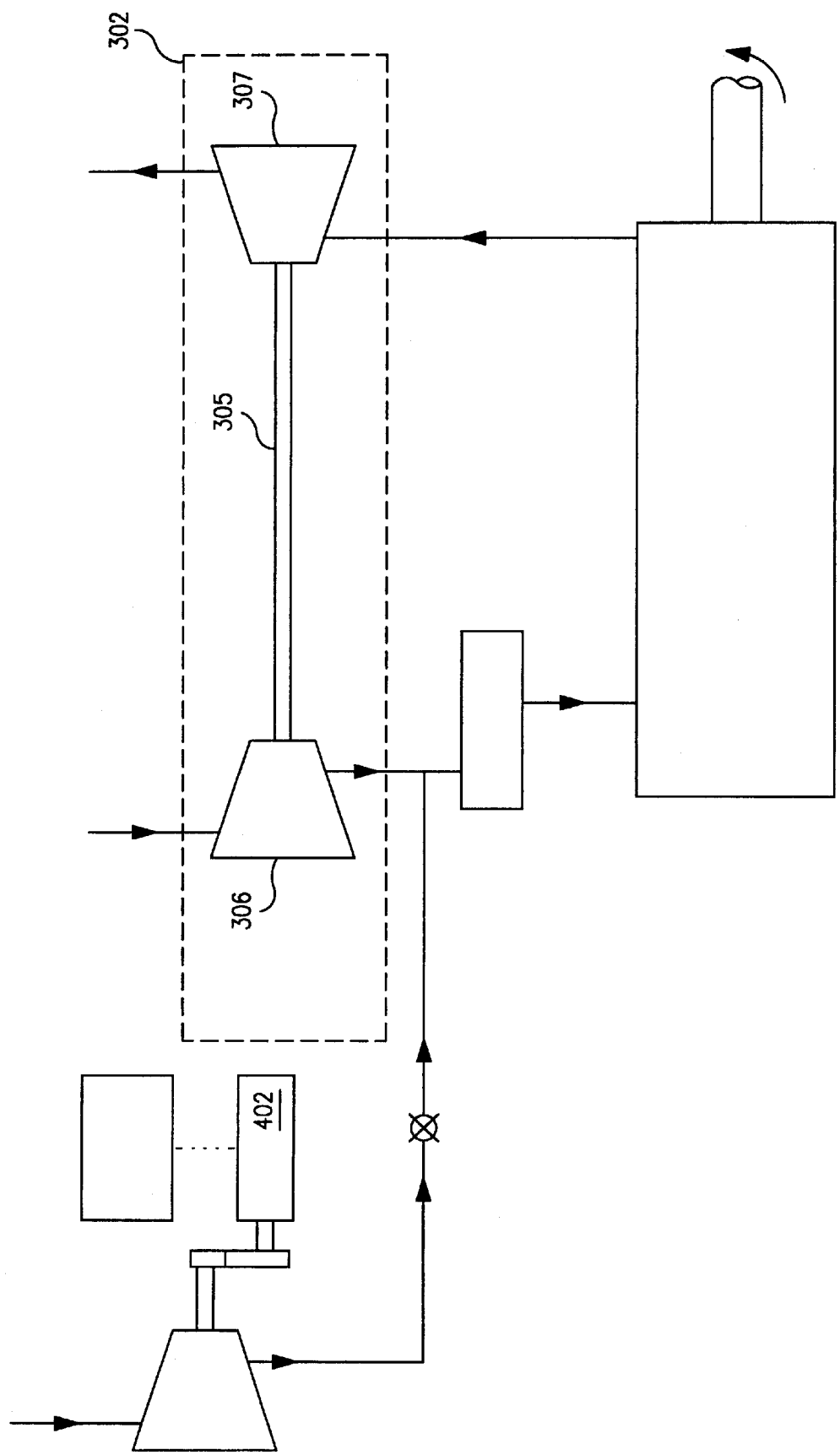

In one embodiment, shown in FIG. 7, turbo-charger 302 may include, e.g. an electric motor 402 to assist a compressor 306 of turbo-charger 302. Electric motor 402 may be used to turn compressor 306 if, e.g. there are not sufficient post-combustion gases 118 to drive compressor 306 adequately. This may be the case under operating conditions such as, e.g. start-up or low-speed operation. Electric motor 402 may be used to control the pressure in the combustion chamber 106 relative to the pressure in e.g. exhaust manifold 126 in the same manner as the clutch-driven compressor.

If, e.g. an engine or powertrain controller called for internal exhaust gas recirculation, a speed or a torque of electric motor 402 could be, e.g. partially or completely reduced, reducing the pressure of pressurized pre-combustion gases 114 being supplied to combustion chamber 106 relative to that of exhaust manifold 126. Since post-combustion gases 118 would then be at a higher pressure than that of combustion chamber 106, some post-combustion gases 118 would be returned to combustion chamber 106 when both intake valve 110 and exhaust valve 116 were open.

Engine performance may also be enhanced by including a variable geometry turbo-charger. A variable geometry turbo-charger improves low engine speed operation. Turbo-charger 302 may be, e.g. a fixed-geometry turbo-charger, a variable-geometry turbo-charger, or a low inertia turbo-charger. In one embodiment, also shown in FIG. 8, turbo-charger 302 may include, e.g. an 87 mm diameter compressor and a 76 mm diameter turbine.

Figure 8:
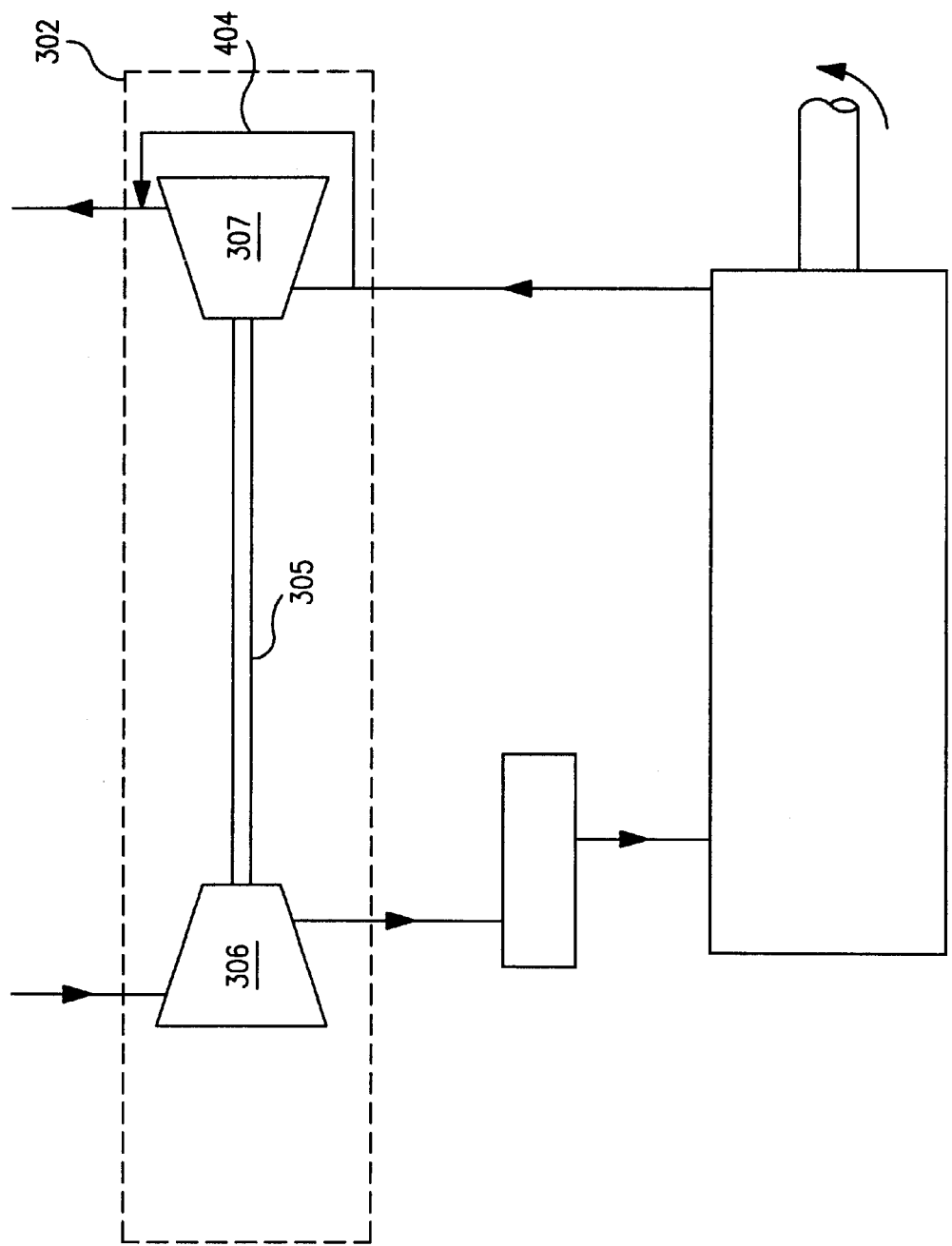
FIG. 8 is a schematic diagram of a turbo-charged internal combustion engine according to an embodiment of the invention.

In another embodiment, also shown in FIG. 8, turbo-charger 302 may include, e.g. a waste gate 404. Waste gate 404 may be used to control the pressure in the combustion chamber 106 relative to the pressure in e.g. exhaust manifold 126 in a manner similar to the clutch-driven compressor. Having wastegate 404 as an option allows the use of a smaller turbine housing or a smaller turbine wheel and may also allow higher airflow at lower engine speeds and torques. Use of a smaller turbine housing or a smaller turbine wheel may further result in improved turbo-charger response during transient engine conditions. A drawback of using a smaller turbine housing or a smaller turbine wheel, on the other hand, may be excessive turbine boost and speed at higher engine speeds and torque. Higher turbine boost may produce higher cylinder pressures and increase thermal loading of the aftercooler, as well.

If, e.g. an engine or powertrain controller called for lower cylinder pressures, waste gate 404 could be, e.g. partially or completely opened, reducing the pressure of pressurized pre-combustion gases 114 being supplied to combustion chamber 106. Opening the wastegate 404 may also reduce turbine speed, consequently prolonging the lives of the compressor and the turbine and reducing thermal loading of aftercooler 202.

Figure 9A:
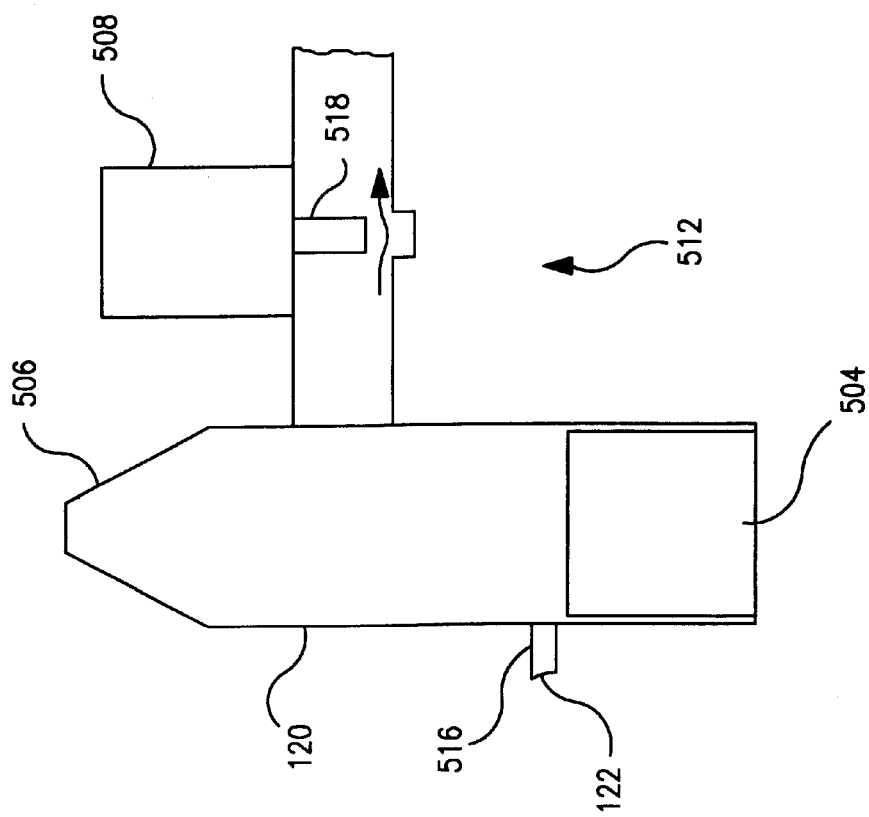
FIGS. 9A–9C is a schematic diagram of a fuel injector for use with an embodiment of the invention.

As shown in FIG. 1, a fuel injector 120 may be disposed in-cylinder head 104 to admit fuel 122 to combustion chamber 106. As shown in FIG. 9, fuel injector 120 may include a pump chamber 502, a fuel-injecting plunger 504 that reciprocates within pump chamber 502, and a discharge nozzle 506 connected to pump chamber 502 for injecting fuel 122 into combustion chamber 106.

Figure 9B:
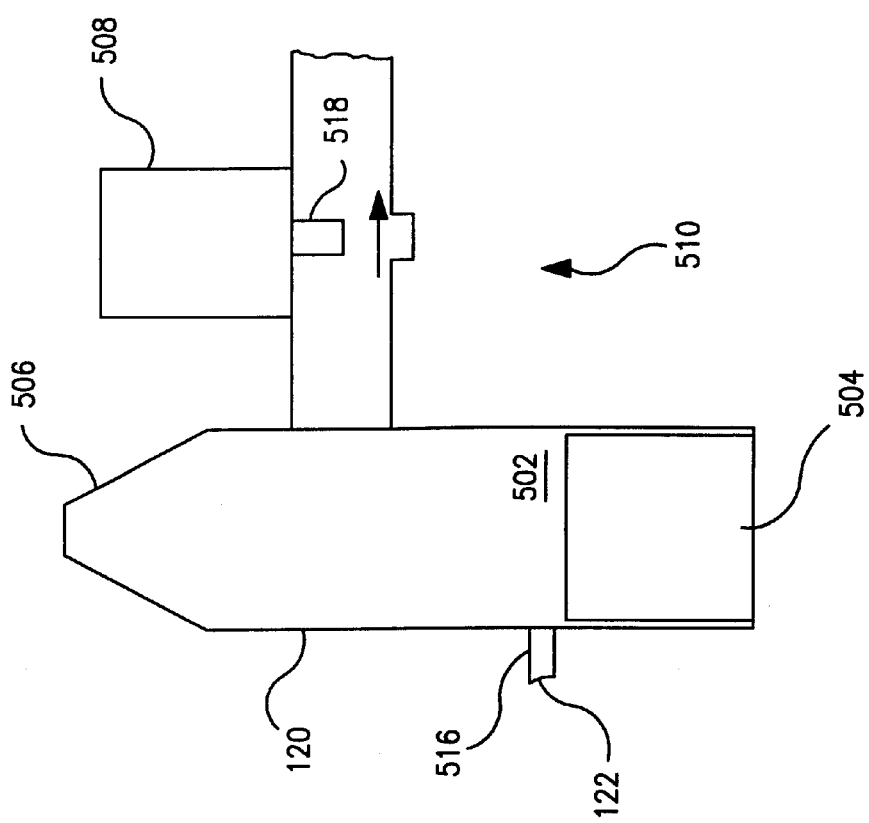
Figure 9C:
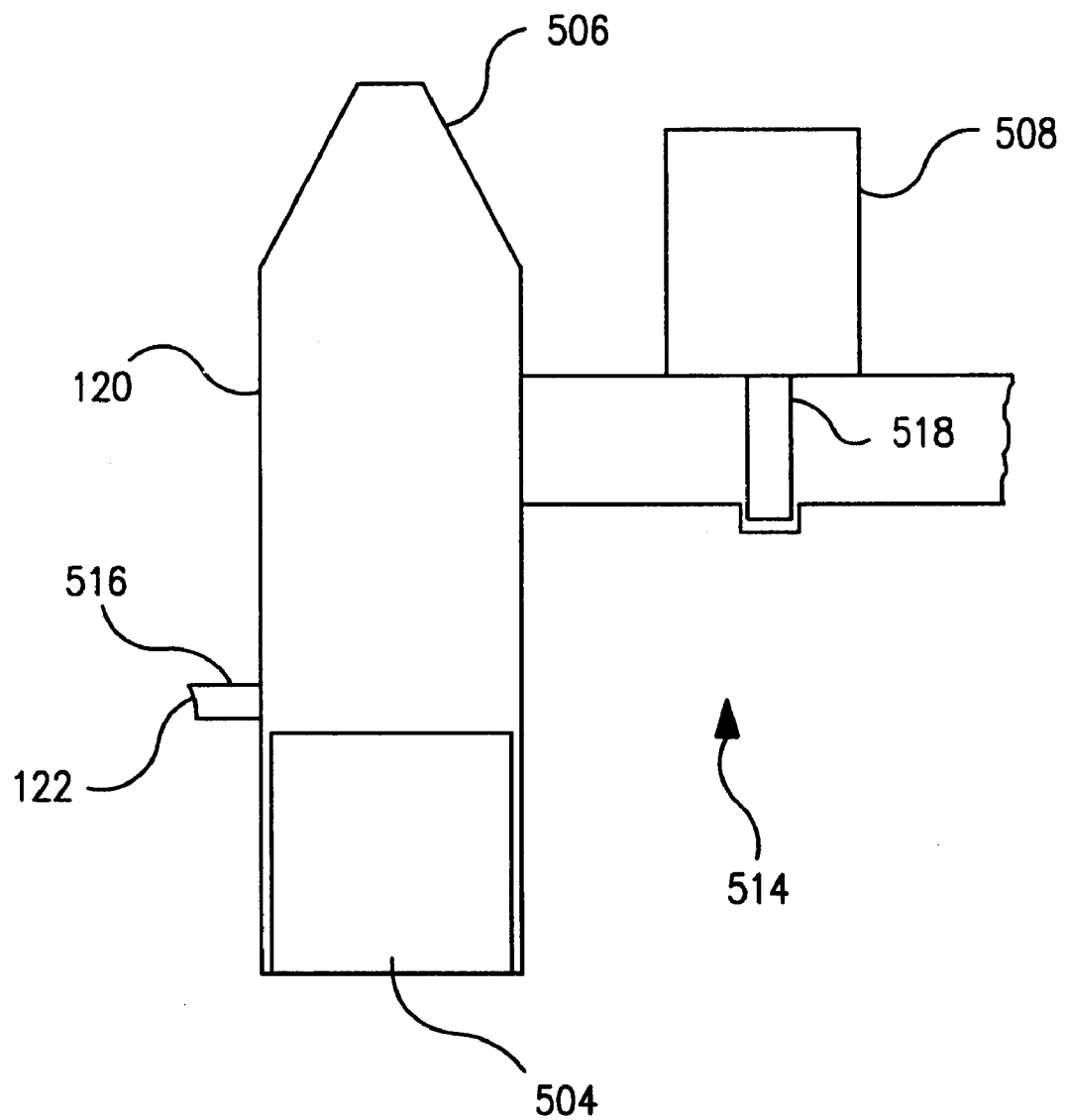

A spill valve 508 may be positioned between pump chamber 502 and discharge nozzle 506 for controlling a rate of fuel injection to combustion chamber 106. The spill valve 508 shown in FIG. 9 has three positions. Spill valve 508 has a first position 514 providing a maximum fuel injection rate when spill valve plunger 518 is closed (FIG. 9C), a second position 510 providing a substantially zero fuel injection rate when the spill valve plunger 518 is fully open (FIG. 9A), and at least one intermediate position 512 providing an intermediate fuel injection rate between maximum fuel injection rate and zero fuel injection rate when the spill valve plunger 518 is partially closed (FIG. 9B).

In operation, fuel 122 may be fed to the fuel injector 120 by the fuel supply line 516. The fuel-injecting plunger 504 pressurizes the fuel 122, and the spill valve 508 controls the spilling of fuel above the fuel-injecting plunger 504. When the spill valve 508 is completely open, fuel is spilled at a rapid rate, and no increase in the fuel pressure occurs. When the spill valve 508 is partially closed, the fuel above the fuel-injecting plunger 504 may be pressurized, but due to the slight spilling action the spilling effectively reduces the cam velocity. When the spill valve 508 is completely closed, the fuel may be completely pressurized and the discharge nozzle 506 opens.

This spilling action may be electronically controlled, and may occur, for example, during the first (and critical) five to ten crank degrees of fuel injection. This may be especially important for urban operation. It should be appreciated, however, that the electronically controlled spilling action may be performed at any time, and it is not strictly confined to the first five to ten crank degrees of fuel injection.

There may be an opportunity to reduce cam velocity associated with injection rate shaping. The effective reduction in cam velocity may be dependent on the spill area offered by the configuration of the spill valve 508. The duration of the spilling action may be dependent on the reaction capability of the spill valve 508 (i.e., how quickly the valve may be opened or closed). In a preferred embodiment, the three-position spill valve 508 should be capable of moving to the partially closed position and dwelling at this position for approximately one millisecond before completely closing.

In one embodiment, spill valve 508 actuation may be, e.g. controlled electronically, and can open at any time in an engine cycle. In one embodiment, spill valve 508 may be, e.g. actuated by a solenoid. In another embodiment, spill valve 508 may be, e.g. a magnetic-latching spill valve. In one embodiment, spill valve 508 may be, e.g. capable of dwelling at an intermediate position 514 for about one millisecond. In another embodiment, spill valve 508 may be, e.g. capable of attaining at least one intermediate position 514 during a first five to ten degrees of crankshaft rotation.

In one embodiment, an intermediate fuel injection rate may be, e.g. used when a load on the engine is between 20% of a maximum load and 100% of a maximum load. Injection rate shaping may occur, e.g. from peak torque to rated engine speed. This will allow further reduction in NOx in addition to NOx reduction due to in-cylinder EGR.

An added benefit of injection rate shaping may also be higher stack temperatures, which will improve after treatment efficiencies. Addition of injection rate shaping may also allow a reduction in the duration of exhaust valve reopening which helps in improving the low engine speed operation while maintaining NOx at an acceptable level.

In another embodiment, an intermediate fuel injection rate may be, e.g. used when a speed of the engine is between the speed at which a peak torque occurs and a rated engine speed.

In another embodiment, as shown in FIG. 4, first and second exhaust cam lobes 702, 704 may, e.g. be operably disposed to open exhaust valve 116. During an exhaust stroke, first cam lobe 702 may, e.g. open exhaust valve 116 to exhaust post-combustion gases 118 to exhaust manifold 126 while intake valve 110 is substantially closed. Then, during the following intake stroke, second cam lobe 704 may open exhaust valve 116 to admit post-combustion gases 118 to combustion chamber 108 while intake valve 110 is substantially open and exhaust port pressure 710 is momentarily higher than cylinder pressure 712.

In one embodiment, a maximum fuel injection rate may be used when exhaust valve 116 is substantially closed. In another embodiment, an intermediate fuel injection rate may be used when exhaust valve 116 is open to admit post-combustion gases to combustion chamber 106.

Figure 10:
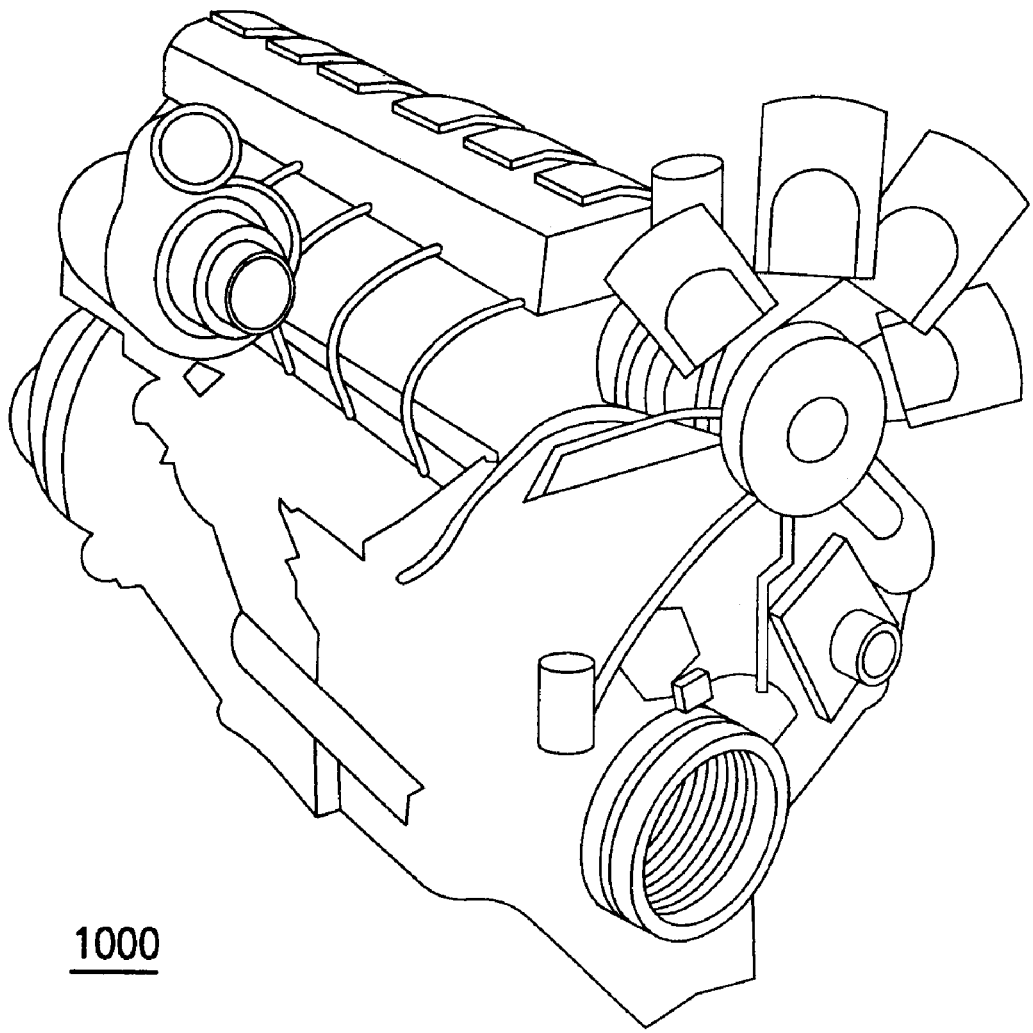
FIG. 10 is a three-quarter view of a turbo-charged internal combustion engine according to an embodiment of the invention.

In FIG. 10 is shown a turbo-charged internal combustion engine 1000 according to a second embodiment of the invention. In FIG. 10 a plurality of cylinder assemblies 100 may be combined to form an engine 1000. In this embodiment, six cylinder assemblies 100 are combined to form engine 1000. In an alternative embodiment, four cylinder assemblies 100 are combined to form engine 1000. In a further alternative embodiment, eight cylinder assemblies 100 are combined to form engine 1000. Various numbers of cylinder assemblies 100 may be arranged in, e.g. an in-line, a vee, a radial, an opposed, or a flat configuration without departing from the spirit of the invention.

Figure 11:
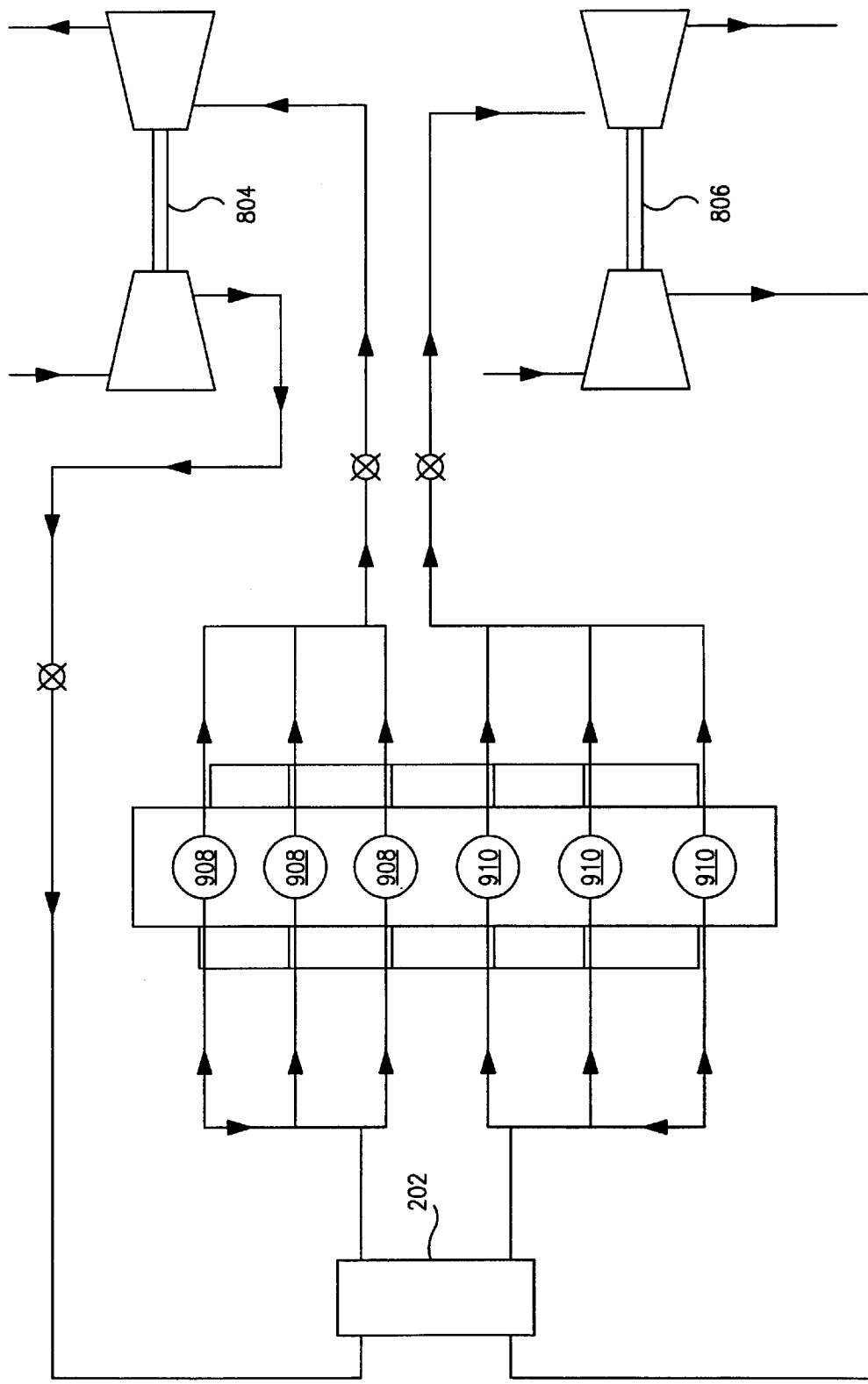
FIG. 11 is a schematic diagram of a turbo-charged internal combustion engine according to an embodiment of the invention.

As shown in FIG. 11, six cylinder assemblies 100 are connected to a first and second turbo-chargers 804, 806. In this embodiment, half of the plurality of cylinder assemblies 100 communicates substantially exclusively via exhaust manifold 126 with first turbo-charger 804, while the other half communicates substantially exclusively via exhaust manifold 126 with second turbo-charger 806. For example, a plurality of six cylinder assemblies 100 would include a first three cylinders 908 and a second three cylinders 910, while a plurality of four cylinder assemblies 100 would include a first two cylinders and a second two cylinders.

If, e.g. a firing order of an in-line six-cylinder engine were 1-5-3-6-2-4, exhaust pulses from the first, second, and third cylinders could be applied to first turbo-charger 804, while exhaust pulses from the fourth, fifth, and sixth cylinders could be applied to second turbo-charger 806. This would distribute the exhaust pulses seen by each of turbo-chargers 804, 806 substantially 240° apart, rather than 120° as would be the case if all of the runners met at a single turbo-charger.

Exhaust pulses arriving 240° apart may be less likely to be diluted by preceding or following pulses than if they were arriving 120° apart. There may thus be less interpulse interference, to paraphrase communications jargon. Exhaust pulses arriving 240° apart may thus be easier to measure and control than those spaced more closely together. Furthermore, two turbo-chargers 804, 806 could be smaller than a single turbo-charger, and thus of lower inertia. Two turbo-chargers 804, 806 of lower inertia would be easier to wind up. Two turbo-chargers 804, 806 may thus be able to respond to transients faster than a single turbo-charger.

If the engine were equipped with an aftercooler 202, the output from turbo-chargers 804, 806 could be plumbed separately through aftercooler 202, to substantially preserve the independence of the outputs.

More than two turbo-chargers could be used, without departing from the spirit of the invention. At the limit, an individual turbo-charger could be used for each cylinder. In that case the pressure drop across each runner could be controlled individually, resulting in relatively precise internal exhaust gas recirculation.

Figure 12:
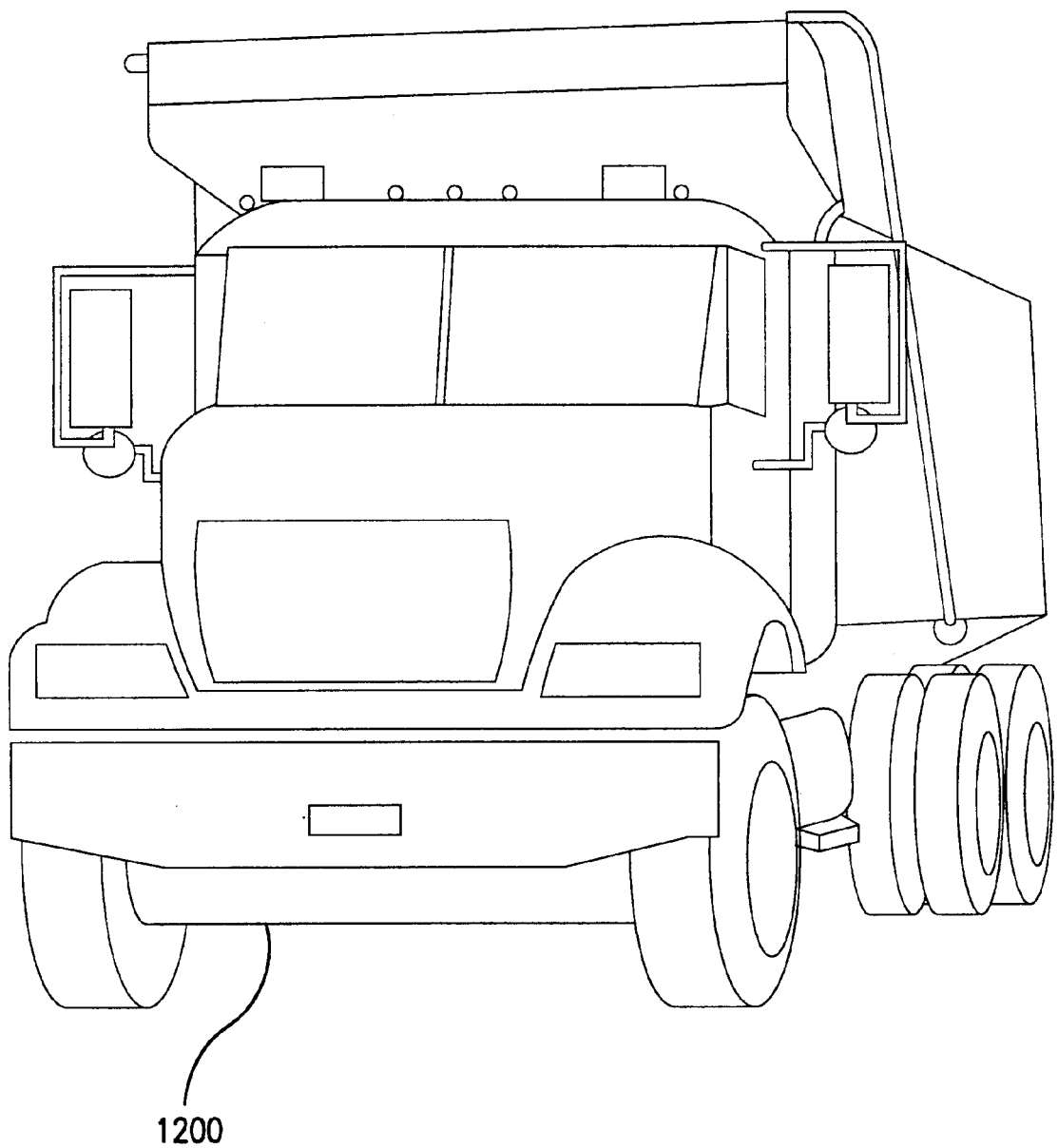
FIG. 12 is a three-quarter view of a tractor for use with an embodiment of the invention.

In FIG. 12 is shown a third embodiment of the invention. In FIG. 12 a turbo-charged internal combustion engine 800 may be installed in a tractor 1200. An embodiment of the invention could also be used in, e.g. stationary applications, marine applications, agricultural equipment, earth moving equipment, locomotives, or aircraft, including lighter-than-air craft.

Figure 13:
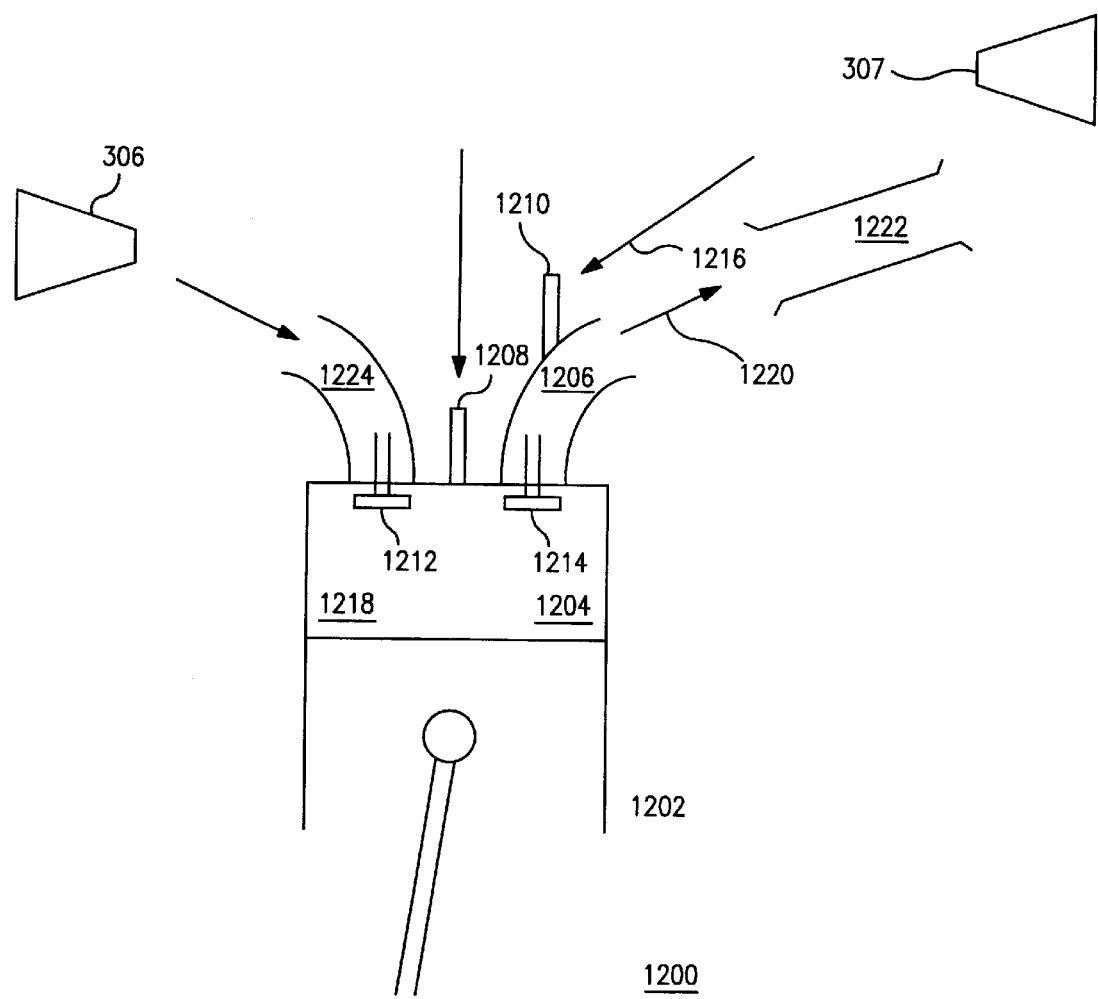
FIG. 13 is a schematic diagram of a turbo-charged internal combustion cylinder assembly according to an embodiment of the invention.
Figure 14A:
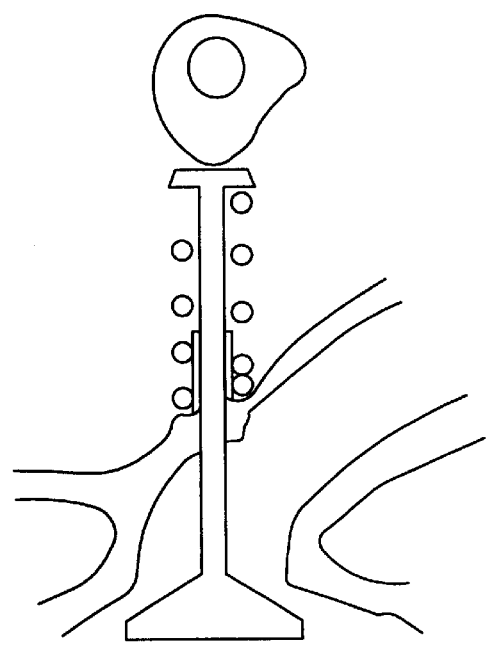
FIGS. 14A–14E shows actuators for use with an embodiment of the invention.
Figure 14B:
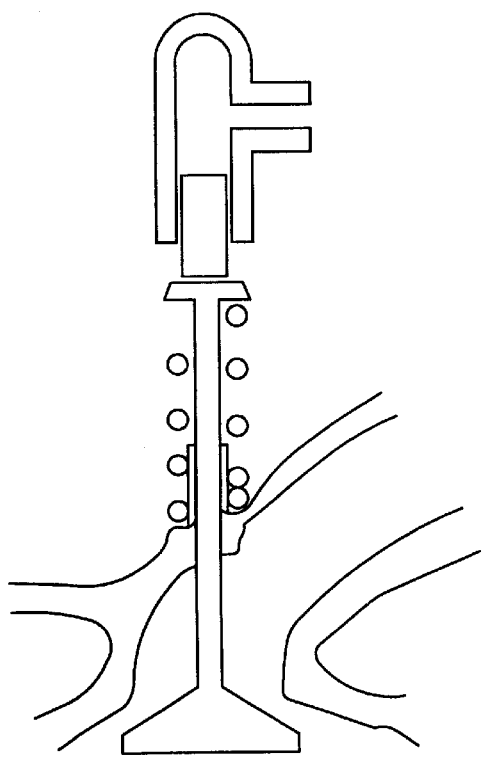
Figure 14C:
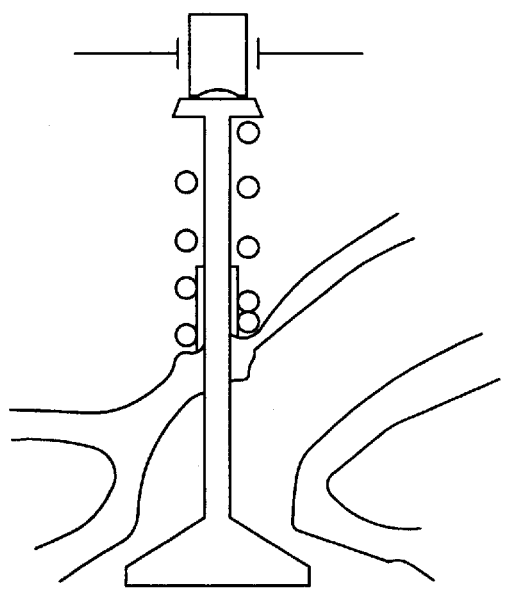
Figure 14D:
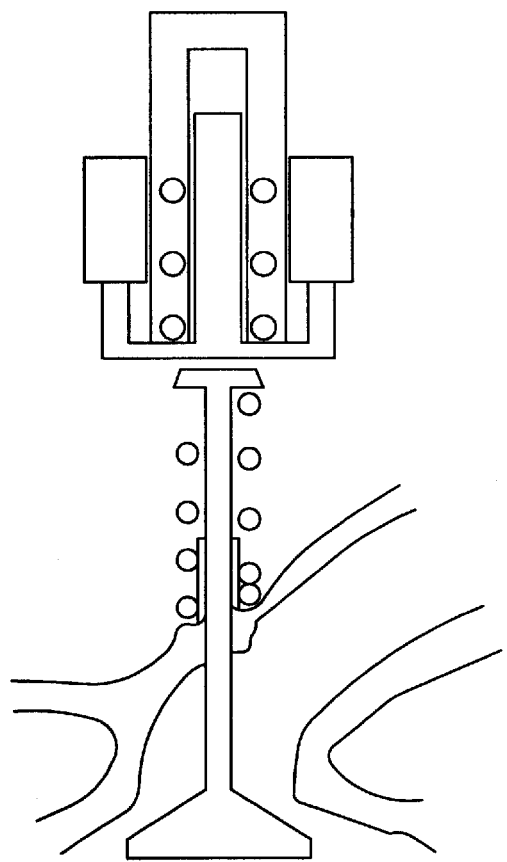
Figure 14E:
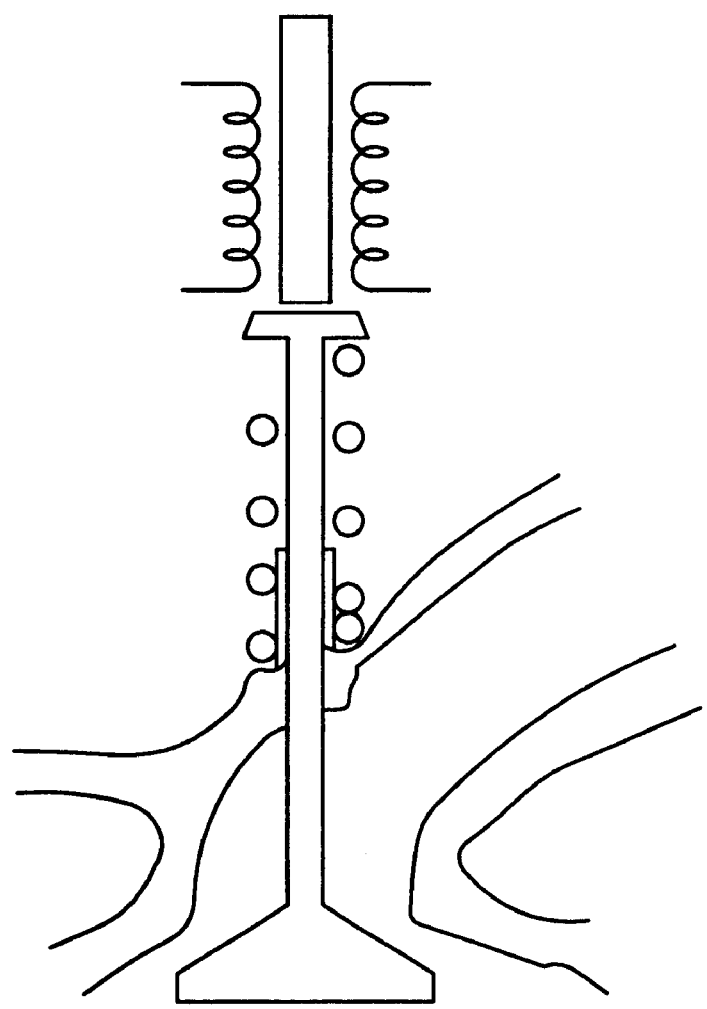
Figure 15A:
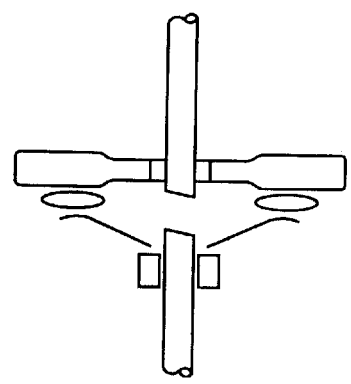
FIGS. 15A–15E shows clutches for use with an embodiment of the invention.
Figure 15B:
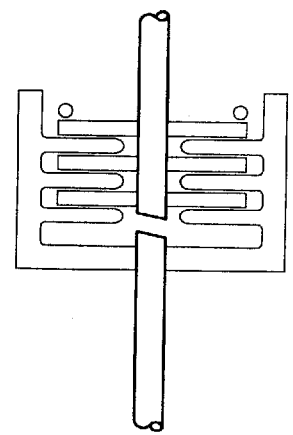
Figure 15C:
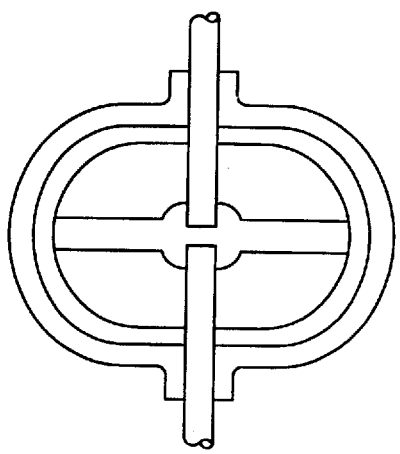
Figure 15D:
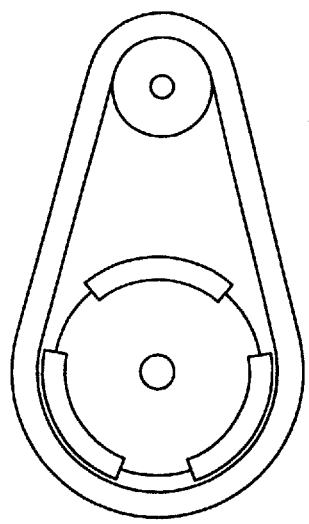
Figure 15E:
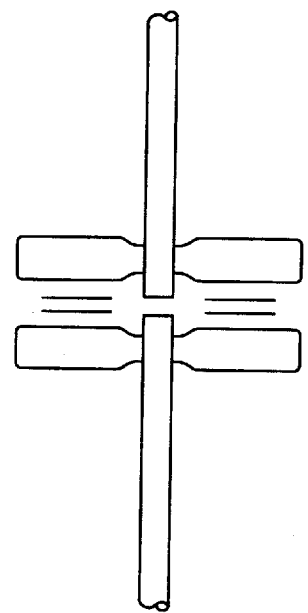

In FIG. 13 is shown a turbo-charged internal combustion engine system 1200 according to a fourth embodiment of the invention. System 1200 includes a cylinder 1202 having a combustion chamber 1204 with an intake port 1224 and an exhaust port 1206. An intake valve 1212 may be disposed in intake port 1224 to admit pre-combustion gases to combustion chamber 1204, while an exhaust valve 1214 may be disposed in exhaust port 1206 to exhaust post-combustion gases 1220 to an exhaust manifold 1222.

Exhaust valve 1214 may be operable to admit post-combustion gases 1220 to combustion chamber 1204 while intake valve 1212 is open and an exhaust port pressure 1216 in exhaust port 1206 is higher than a combustion chamber pressure 1218 in combustion chamber 1204.

A first fuel injector 1208 may be disposed, e.g. in combustion chamber 1204, or, in the alternative, in intake port 1224. This may be the case in, e.g. a spark-ignited engine. A second fuel injector 1210 may be disposed, e.g. in exhaust port 1206. Each of first and second fuel injectors 1208, 1210 may be equipped individually for injection rate or pulse shaping.

First fuel injector 1208 may admit fuel to combustion chamber 1204 while intake valve 1212 is open, e.g. during an intake stroke. First fuel injector 1208 may also admit fuel to combustion chamber 1204 while intake and exhaust valves 1212, 1214 are closed, i.e. near the end of a compression stroke. This may be the case in, e.g. a compression ignition engine.

In one embodiment, both first and second fuel injectors 1208, 1210 may admit fuel to combustion chamber 1204 while intake and exhaust valves 1212, 1214 are open and exhaust port pressure 1216 is higher than combustion chamber pressure 1218, i.e. during internal exhaust gas recirculation. In another embodiment, only second fuel injector 1210 admits fuel to combustion chamber 1204 during internal EGR.

Since post-combustion gases 1220 are comprised largely of, e.g. carbon dioxide and water, both of which are common fire retardants, combustion is not likely to occur prematurely. That is, the fuel being injected into the stream of post-combustion gases 1220 being returned to combustion chamber 1204 will not ignite in the absence of oxygen. The fuel will, however, be warmed by the heat of post-combustion gases 1220, in the manner of a regenerator.

Raising the temperature of incoming fuel will increase the likelihood that when combustion does occur it will be substantially complete, thus reducing emission of unburned hydrocarbons. Also, raising the temperature at which heat is added to the combustion chamber by using heat that would otherwise be rejected may result in efficiencies over an engine in which fuel is injected cold.

In a fifth embodiment, the invention includes a method of controlling combustion in an internal combustion engine comprising the steps of transferring a first quantity of fuel and first post-combustion gases to a combustion chamber through an exhaust port to raise a temperature of said first quantity of fuel while an exhaust port pressure in the exhaust port is higher than a first combustion chamber pressure.

The A/F ratio and the temperature will be too low to ignite the fuel during this time, but the post-combustion gases will have transferred their heat to the fuel, warming it up. Pre-combustion gases are then transferred into the combustion chamber at the first combustion chamber pressure, mixing with the first quantity of fuel, the pre-combustion gases, and the first post-combustion gases to form a substantially homogenous mixture. The intake and exhaust ports are substantially sealed, and heat is added to the combustion chamber by raising the first combustion chamber pressure to a second combustion chamber pressure substantially higher than the first combustion chamber pressure, i.e. during a compression stroke. Fuel injected by fuel injector 1208 disposed in combustion chamber 1204 may, e.g. initiate combustion when the piston is near top dead center during a compression stroke.

In a sixth embodiment, the step of transferring a first quantity of fuel into combustion chamber occurs substantially between a crankshaft angle of 380° and a crankshaft angle of 470°, i.e. during internal EGR.

In a seventh embodiment, the step of transferring the first quantity of fuel and first post-combustion gases to the combustion chamber through the exhaust port comprises further the step of injecting the first quantity of fuel into the exhaust port.

In an eighth embodiment, the step of injecting a second quantity of fuel into the combustion chamber occurs substantially between a crankshaft angle of 380° and a crankshaft angle of 470°.

In a ninth embodiment, the step of injecting both a first quantity of fuel and a second quantity of fuel into the combustion chamber occurs substantially between a crankshaft angle of 380° and a crankshaft angle of 470°.

In a tenth embodiment, the step of injecting a third quantity of fuel into the combustion chamber occurs substantially between the angles of −25° to 5° after top dead center (ATDC).

In an eleventh embodiment, the step of injecting a third quantity of fuel further comprises the step of shaping a rate of fuel injection.

In a twelfth embodiment, the step of mixing 1) a first quantity of fuel, pre-combustion gases, and first post-combustion gases, 2) a second quantity of fuel, pre-combustion gases, and first post-combustion gases, and 3) first and second quantities of fuel, pre-combustion gases, and first post-combustion gases to form a substantially homogenous mixture occurs substantially between a crankshaft angle of 400° and a crankshaft angle of 695°, i.e. during an intake stroke.

Injection rate shaping capability with air systems improvement (i.e. variable geometry turbo-charger, electrically assisted turbo-charger, light inertia turbo-charger (ceramic turbine wheel, titanium aluminide turbine wheel, smaller compressor and turbine trim)), may improve low engine speed operation, and also help with transient engine response.

Steady state and transient emissions and engine performance data shows that in-cylinder EGR in conjunction with rate shaping with properly matched turbo-charger can result in significant reduction in NOx (reduction in excess of 20% NOx) with minimal increase in particulates (PM). In one example, overall airflow dropped about 10% due to in-cylinder EGR. As a result, a much smaller turbo-charger may be used (which helps in engine response) than would be used on a typical 12-liter engine. Also rate shaping enabled enhanced turbo-charger response by providing hotter pre-turbine temperatures.

The lower airflow through the engine (due to in-cylinder EGR) may permit using a lower volume exhaust manifold. This also helps on transient engine response, which lowers particulates, and on maintaining higher exhaust port pressure, thus allowing more in-cylinder EGR, which in turn helps to reduce NOx.

In Table 1 is shown representative engine test data:

TABLE 1

|  | OICA* | Transient* | OICA** | Transient** |
|---|---|---|---|---|
| NOx (g/bhp * hr) | 3.245 | 3.210 | 2.435 | 2.450 |
| PM (g/bhp * hr) | 0.048 | 0.075 | 0.060 | 0.093 |

*Injection Rate Shaping Alone
**Injection Rate Shaping + In-cylinder Exhaust Gas Recirculation Although the preferred embodiment above discloses the use of a solenoid-type valve, it is contemplated that a magnetic latching valve may optionally be used. In addition, although a three-position spill valve is disclosed in the preferred embodiment, alternatively a spill valve may be used having more than three positions in order to provide an even more finely controlled flow of fuel.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A turbo-charged internal combustion cylinder assembly comprising:
   a cylinder having a cylinder head at an end thereof, and a combustion chamber disposed in said cylinder head;
   an intake port disposed in said cylinder head, an intake valve movably disposed in said intake port, said combustion chamber communicably connected to a compressor via said intake port, said compressor providing pre-combustion gases to said combustion chamber when said intake valve is open;
   an exhaust port disposed in said cylinder head, an exhaust valve movably disposed in said exhaust port, said combustion chamber communicably connected to an exhaust manifold via said exhaust port;
   wherein said exhaust valve opens to exhaust post-combustion gases to said exhaust manifold while said intake valve is substantially closed; and
   wherein said exhaust valve opens to admit post-combustion gases to said combustion chamber while said intake valve is substantially open; and
   a fuel injector disposed in said cylinder head to admit fuel to said combustion chamber, said fuel injector comprising further a pump chamber, a fuel-injecting plunger for reciprocating within said pump chamber, and a discharge nozzle connected to said pump chamber for injecting fuel into said combustion chamber; and
   a spill valve positioned between said pump chamber and said discharge nozzle for controlling a rate of fuel injection to said combustion chamber, said spill valve having a first position providing a maximum fuel injection rate, a second position providing a substantially zero fuel injection rate, and at least one intermediate position providing an intermediate fuel injection rate between said maximum fuel injection rate and said zero fuel injection rate.

2. The turbo-charged internal combustion cylinder assembly of claim 1, comprising further first and second exhaust cam lobes operably disposed to open said exhaust valve;
   wherein said first cam lobe opens said exhaust valve to exhaust post-combustion gases to said exhaust manifold while said intake valve is substantially closed; and
   said second cam lobe opens said exhaust valve to admit post-combustion gases to said combustion chamber while said intake valve is substantially open.

3. The turbo-charged internal combustion cylinder assembly of claim 1, wherein said turbo-charger comprises a clutch-driven compressor.

4. The turbo-charged internal combustion cylinder assembly of claim 1, comprising further an aftercooler to cool said pre-combustion gases.

5. The turbo-charged internal combustion cylinder assembly of claim 4, comprising further a shutoff valve between said compressor and said aftercooler to reduce a flow of said pre-combustion gases.

6. The turbo-charged internal combustion cylinder assembly of claim 1, comprising further a shutoff valve between said compressor and said combustion chamber to reduce a flow of said pre-combustion gases.

7. The turbo-charged internal combustion cylinder assembly of claim 1, comprising further a bypass valve to bypass said compressor to reduce a flow of said pre-combustion gases.

8. The turbo-charged internal combustion cylinder assembly of claim 1, comprising further an electric motor to assist said compressor.

9. The turbo-charged internal combustion cylinder assembly of claim 1, wherein said compressor is selected from the group consisting of:
- a fixed-geometry compressor,
- a variable-geometry compressor,
- an electrically-assisted compressor, and
- a low inertia compressor.

10. The turbo-charged internal combustion cylinder assembly of claim 1, wherein said turbo-charger comprises further:
- a waste gate.

11. The turbo-charged internal combustion cylinder assembly of claim 1, wherein said turbo-charger comprises further:
- an 87 mm diameter compressor; and
- a 76 mm diameter turbine.

12. A turbo-charged internal combustion engine comprising:
- a plurality of cylinders, each of said cylinders comprising:
  - a cylinder head fixedly disposed at an end of said cylinder, and a combustion chamber disposed in said cylinder head;
  - an intake port disposed in said cylinder head, an intake valve movably disposed in said intake port, said combustion chamber communicably connected to a compressor via said intake port, said compressor providing pre-combustion gases to said combustion chamber when said intake valve is open;
  - an exhaust port disposed in said cylinder head, an exhaust valve movably disposed in said exhaust port, said combustion chamber communicably connected to an exhaust manifold via said exhaust port;
  - wherein one of said exhaust valves opens to exhaust post-combustion gases to said exhaust manifold while a corresponding one of said intake valves is substantially closed; and
  - wherein one of said exhaust valves opens to admit post-combustion gases to said combustion chamber while one of said intake valves is substantially open; and
  - a fuel injector disposed in said cylinder head to admit fuel to said corresponding combustion chamber, said fuel injector comprising further a pump chamber, a fuel-injecting plunger for reciprocating within said pump chamber, and a discharge nozzle connected to said pump chamber for injecting fuel into said combustion chamber; and
  - a spill valve positioned between said chamber and said nozzle for controlling a rate of fuel injection to said combustion chamber, said spill valve having a first position providing a maximum fuel injection rate, a second position providing a substantially zero fuel injection rate, and at least one intermediate position providing an intermediate fuel injection rate between said maximum fuel injection rate and said zero fuel injection rate.

13. The turbo-charged internal combustion engine of claim 12, wherein said plurality of cylinders is six.

14. The turbo-charged internal combustion engine of claim 13, wherein said compressor comprises a first and a second compressors;
said six cylinders are comprised of a first three cylinders and a second three cylinders; and
wherein said first compressor communicates substantially exclusively with said first three cylinders and said second compressor communicates substantially exclusively with said second three cylinders.

15. A tractor comprising:
- a turbo-charged internal combustion engine, said engine comprising:
  - a plurality of cylinders, each of said cylinders comprising:
    - a cylinder head fixedly disposed at an end of said cylinder, and a combustion chamber disposed in said cylinder head;
    - an intake port disposed in said cylinder head, an intake valve movably disposed in said intake port, said combustion chamber communicably connected to a compressor via said intake port, said compressor providing pre-combustion gases to said combustion chamber when said intake valve is open;
    - an exhaust port disposed in said cylinder head, an exhaust valve movably disposed in said exhaust port, said combustion chamber communicably connected to an exhaust manifold via said exhaust port;
    - wherein one of said exhaust valves opens to exhaust post-combustion gases to said exhaust manifold while a corresponding one of said intake valves is substantially closed; and
    - wherein one of said exhaust valves opens to admit post-combustion gases to said combustion chamber while one of said intake valves is substantially open; and
    - a fuel injector disposed in said cylinder head to admit fuel to said corresponding combustion chamber, said fuel injector comprising further a pump chamber, a fuel-injecting plunger for reciprocating within said pump chamber, and a discharge nozzle connected to said pump chamber for injecting fuel into said combustion chamber; and
    - a spill valve positioned between said chamber and said nozzle for controlling a rate of fuel injection to said combustion chamber, said spill valve having a first position providing a maximum fuel injection rate, a second position providing a substantially zero fuel injection rate, and at least one intermediate position providing an intermediate fuel injection rate between said maximum fuel injection rate and said zero fuel injection rate.

* * * * *